United States Patent
Bartkiewicz et al.

(10) Patent No.: US 9,871,752 B2
(45) Date of Patent: Jan. 16, 2018

(54) PERSONAL COMMUNICATION SYSTEM FOR GENERATING AND DELIVERING A PERSONALIZED COMMUNICATION BASED ON A TIME CONDITION

(71) Applicant: Lett.rs LLC, Canton, CT (US)

(72) Inventors: Drew Charles Bartkiewicz, Canton, CT (US); Blake Daniel Bartkiewicz, Canton, CT (US)

(73) Assignee: LETT.RS LLC, Canton, CT (US)

(*) Notice: Subject to any disclaimer, the term of this patent is extended or adjusted under 35 U.S.C. 154(b) by 316 days.

(21) Appl. No.: 14/559,897

(22) Filed: Dec. 3, 2014

(65) Prior Publication Data
US 2015/0156150 A1  Jun. 4, 2015

Related U.S. Application Data

(60) Provisional application No. 61/912,005, filed on Dec. 4, 2013.

(51) Int. Cl.
| | |
|---|---|
| *H04M 1/64* | (2006.01) |
| *G06F 3/048* | (2013.01) |
| *G06F 17/30* | (2006.01) |
| *G06F 15/16* | (2006.01) |
| *G06F 3/00* | (2006.01) |
| *G06Q 10/00* | (2012.01) |
| *H04L 12/58* | (2006.01) |

(52) U.S. Cl.
CPC .............. *H04L 51/14* (2013.01); *G06F 3/048* (2013.01); *G06F 15/16* (2013.01); *G06F 17/30* (2013.01)

(58) Field of Classification Search
CPC .......... G06Q 10/00; H04M 1/64; G06F 3/048; G06F 17/30; G06F 15/16; G06F 3/00
See application file for complete search history.

(56) References Cited

U.S. PATENT DOCUMENTS

| | | |
|---|---|---|
| 2003/0018706 A1 | 1/2003 | Bates et al. |
| 2003/0031996 A1 | 2/2003 | Robinson |
| 2003/0120542 A1* | 6/2003 | Arning .................... G06Q 30/02 705/14.35 |

(Continued)

*Primary Examiner* — Jennifer To
*Assistant Examiner* — Hugo Molina
(74) *Attorney, Agent, or Firm* — Ash Tankha; Lipton, Weinberger & Husick

(57) ABSTRACT

A computer implemented method and a personal communication system (PCS) for generating and delivering a personalized communication based on a time condition. The PCS configures a preliminary time condition and determines an optimal time condition from the preliminary time condition, a sender configured time condition, and a recipient configured time condition. The PCS detects a sender's attempt to generate and send the personalized communication based on media content received from a sender device. The PCS times the composition of the personalized communication, generates a timing verification report that verifies whether the optimal time condition is met, and performs an action based on the verification. The action includes rendering a notification to the sender device for instructing the sender to continue composing the personalized communication until the optimal time condition is met, or generating and delivering the personalized communication to recipient devices when the optimal time condition is met.

16 Claims, 17 Drawing Sheets

(56) References Cited

U.S. PATENT DOCUMENTS

| | | | |
|---|---|---|---|
| 2003/0196116 A1* | 10/2003 | Troutman | H04L 12/585 726/7 |
| 2005/0149606 A1* | 7/2005 | Lyle | H04L 12/581 709/200 |
| 2006/0168049 A1* | 7/2006 | Orozco | H04L 12/581 709/206 |
| 2007/0036300 A1* | 2/2007 | Brown | H04M 1/72519 379/88.22 |
| 2007/0166684 A1* | 7/2007 | Walker | G09B 7/02 434/322 |
| 2009/0232289 A1* | 9/2009 | Drucker | G06Q 10/1091 379/114.03 |
| 2011/0227852 A1 | 9/2011 | Gamble et al. | |
| 2012/0042267 A1* | 2/2012 | Cairns | G06F 3/0481 715/760 |
| 2013/0097255 A1* | 4/2013 | Appelman | G06F 9/542 709/206 |
| 2013/0295535 A1 | 11/2013 | Levy et al. | |
| 2014/0047560 A1* | 2/2014 | Meyer | G06F 21/62 726/28 |
| 2014/0113685 A1* | 4/2014 | Lee | G06F 9/485 455/566 |
| 2014/0201527 A1* | 7/2014 | Krivorot | G06F 21/6209 713/168 |
| 2015/0019654 A1* | 1/2015 | Wheeler | H04L 51/24 709/206 |
| 2015/0274179 A1* | 10/2015 | Inoue | B60W 50/087 701/70 |

* cited by examiner

PERSONAL COMMUNICATION SYSTEM FOR GENERATING AND DELIVERING A PERSONALIZED COMMUNICATION BASED ON A TIME CONDITION

CROSS REFERENCE TO RELATED APPLICATIONS

This application claims priority to and the benefit of provisional patent application No. 61/912,005 titled "Time Based Personal Communication", filed in the United States Patent and Trademark Office on Dec. 4, 2013. The specification of the above referenced patent application is incorporated herein by reference in its entirety.

BACKGROUND

With the advent of high speed communication technology that facilitates communication between people via social networking platforms, text messages, electronic mails (emails), etc., the practice of communicating via slower, more deliberate, and sometimes personalized messages has almost become extinct. Personalized messages that are slowly composed succeed in effectively conveying a person's emotions such as thoughts, sympathies, love, gratitude, etc. Communication through written and often personalized messages typically requires people to actually think about what they are writing. Conventional communication systems do not support meaningful communication in the form of exchange of messages for both business and personal uses. There are many social networking websites and mobile messaging options that allow people to stay in touch with their loved ones, family, and friends. The social networking and mobile messaging industry is overly saturated with cheap and easily available social communication options. While there is an increase in the quantity of such social networking applications, there is a lack of quality of personalization and genuine engagement of participants in communication facilitated by these social messaging applications.

With people being busy in their lifestyle of going to work, school, or college, they often overlook the need of spending enough time in composing personalized messages that would convey their true personality or emotions. By communicating via social networking websites, emails, tweets, short message service (SMS) messages, etc., people typically tend to thoughtlessly type and create their messages in as less time as possible without paying much heed to the importance of conveying the correct emotions and sentiments via these digital messages. Sometimes, a recipient who receives a message from a composer of the message wishes that the composer had spent a more deliberate amount of time in composing a more meaningful and genuine message. However, the intended recipient is not able to convey this need to the composer without offending the composer. There is a need for a computer implemented method and system that ensures that sufficient time is spent by the composer to thoughtfully compose a personalized message to ensure a high quality communication between the composer and an intended recipient of the personalized message.

Hence, there is a long felt but unresolved need for a computer implemented method and system that generates and delivers a digital personalized communication such as a personalized message using a time based strategy.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The computer implemented method and system disclosed herein addresses the above mentioned need for generating and delivering a digital personalized communication such as a personalized message using a time based strategy. The computer implemented method and system disclosed herein generates and delivers a personalized communication, for example, of text, voice, or writing, based on a minimum time condition. The computer implemented method disclosed herein employs a personal communication system comprising at least one processor configured to generate computer program instructions for generating and delivering the personalized communication, for example, via digital delivery based on a time condition. In an embodiment, the personal communication system is accessible to a sender device and one or more recipient devices via a network.

The personal communication system configures a preliminary time condition and displays the configured preliminary time condition on a sender device, for example, a mobile phone, a mobile tablet, or a desktop computer, via a graphical user interface (GUI) provided by the personal communication system. The configured preliminary time condition defines a minimum time required for composing the personalized communication. The personal communication system determines an optimal time condition selected from the configured preliminary time condition, a sender configured time condition, and a recipient configured time condition. The personal communication system receives media content from the sender device via the GUI. The personal communication system detects an attempt by a sender to generate and send the personalized communication based on the received media content. The personal communication system times the composition of the personalized communication on detection of the attempt to generate and send the personalized communication based on the received media content. The personal communication system generates a timing verification report based on the timing for verifying whether the determined optimal time condition is met. The personal communication system performs an action based on the verification indicated in the generated timing verification report. The action comprises, for example, rendering a notification to the sender device for instructing the sender to continue composing the personalized communication until the determined optimal time condition is met, or generating the personalized communication based on the received media content and delivering the generated personalized communication to one or more recipient devices when the determined optimal time condition is met.

In one or more embodiments, related systems include but are not limited to circuitry and/or programming for effecting the methods referenced herein; the circuitry and/or programming can be any combination of hardware, software, and/or firmware configured to effect the herein-referenced methods depending upon the design choices of a system designer. Also, various structural elements may be employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing carries over to the description of that method step or component shown by that same numeral in any subsequent drawing herein.

DETAILED DESCRIPTION OF THE INVENTION

Figure 1:
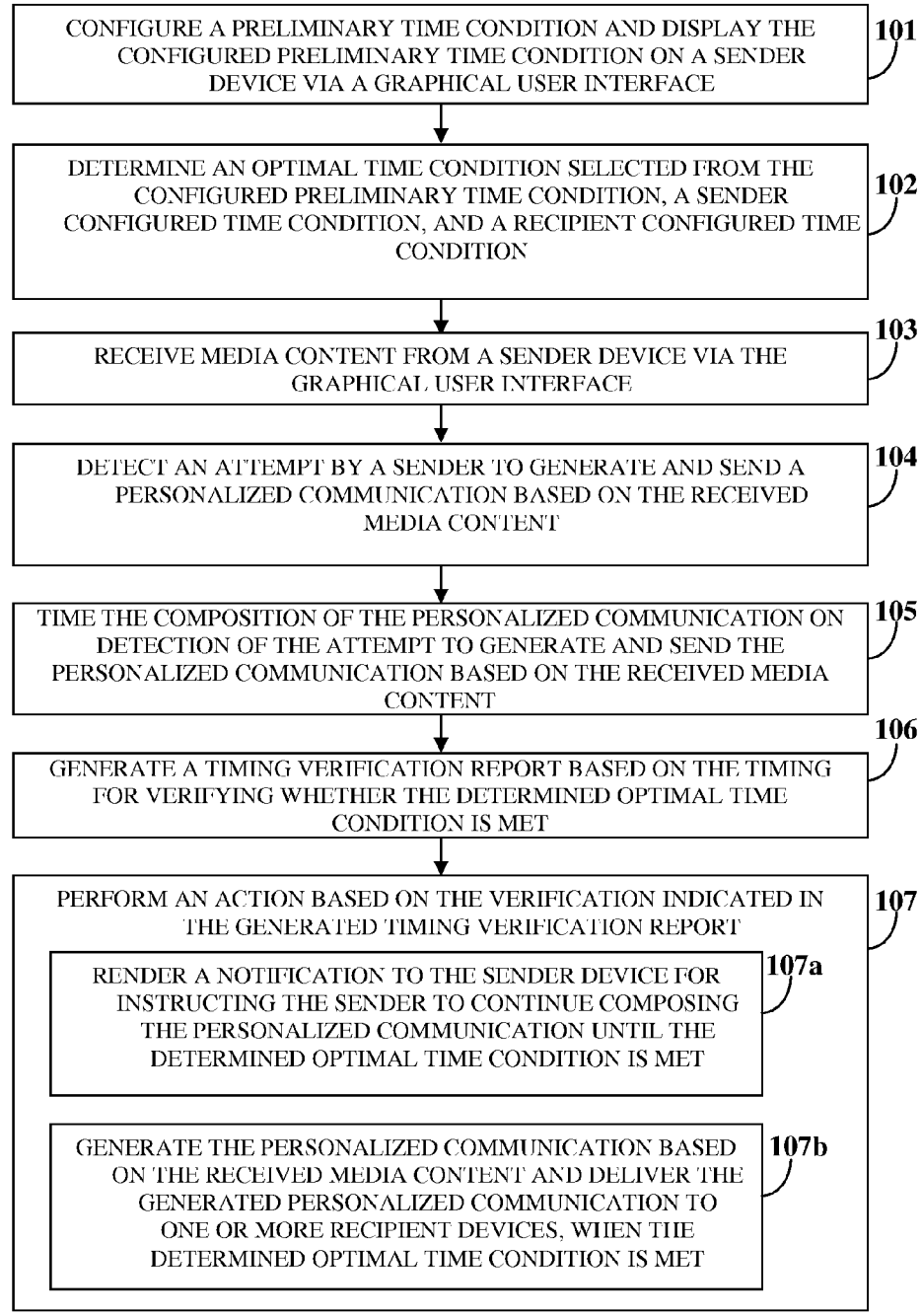
FIG. 1 illustrates a computer implemented method for generating and delivering a personalized communication based on a time condition.

FIG. 1 illustrates a computer implemented method for generating and delivering a personalized communication based on a time condition. A personalized communication can be, for example, a personal correspondence, a letter, a private digital message, a public digital message, a video message, an audio message, etc., that facilitates meaningful and thoughtful digital communication. The computer implemented method disclosed herein solves the problem of fast and disposable communications by providing a time based slow social technology feature that invites composers and senders of personalized communications to pause, slow down, and consider their words while drafting a personalized communication in order to facilitate meaningful communication. As used herein, the term "sender" refers to a user, writer, a creator, or a composer who initiates creation and delivery of a personalized communication to a recipient. Also, as used herein, the term "recipient" refers to a user or a receiver who receives a personalized communication from a sender.

The computer implemented method disclosed herein employs a personal communication system comprising at least one processor configured to execute computer program instructions for generating and delivering a personalized communication based on a time condition. In an embodiment, the personal communication system is implemented as a digital communication-as-a-service platform for international digital content distribution. The personal communication system allows senders to generate and send personalized communications such as personalized messages using a sender device, for example, a mobile device or another communication device. As used herein, "sender device" refers to a communication device utilized by a sender of a personalized communication to access the personal communication system. A sender registered with the personal communication system provides an indication to the personal communication system via a graphical user interface (GUI) provided by the personal communication system, to deliver a personalized communication with a personalized design, while the personal communication system facilitates delivery of the personalized communication in a desired delivery mode as specified by the sender. The personal communication system provides a personalized communication writing platform that facilitates meaningful communication in the world of technology.

The personal communication system configures 101 a preliminary time condition and displays the configured preliminary time condition on the sender device via the GUI provided by the personal communication system. As used herein, "preliminary time condition" refers to time based criteria or a time based rule that defines a minimum writing time required for composing a personalized communication. The preliminary time condition is a configured time condition setting that defines a minimum time requirement that a sender of a personalized communication must meet in order to have his/her personalized communication received by a recipient device, for example, a mobile computing device, a mobile communication device, etc. As used herein, "recipient device" refers to a communication device utilized by a recipient of a personalized communication to access the personal communication system. The minimum time defined in the configured preliminary time condition is, for example, about 1 minute and 12 seconds. The personal communication system implements a hard rule that a personalized communication cannot be created and delivered, for example, in less than about 1 minute and 12 seconds or less than about 72 seconds. In an embodiment, the preliminary time condition defines an initial time that is established, for example, by a system administrator of the personal communication system. For example, the system administrator uses software coding tools to configure or code a specific preliminary time condition that is displayed on the GUI of the personal communication system to a sender while the sender composes a personalized communication.

The personal communication system allows both senders and recipients to influence the minimum time for writing and receiving a personalized communication. In an embodiment, a sender and/or a recipient can increase the preliminary time condition from a settings interface provided on the GUI of the personal communication system. In an embodiment, the personal communication system receives sender defined time parameters from the sender device and adds the received sender defined time parameters to the configured preliminary time condition to generate a sender configured time condition. As used herein, "sender defined time parameters" refer to a duration of time, for example, in minutes, seconds, etc., provided by a sender to increase the minimum time defined in the preliminary time condition for composing a personalized communication. Also, as used herein, "sender configured time condition" refers to time based criteria or a time based rule that is generated by adding a minimum time specified by a sender that he or she requires for composing a personalized communication, to the minimum time defined in the preliminary time condition configured by the personal communication system. The sender configured time condition comprises the sender defined time parameters added to the minimum time defined in the configured preliminary time condition. For example, the personal communication system allows a sender to increase the minimum time from 72 seconds to a higher value by adding the sender defined time parameters to the minimum time of 72 seconds. The sender configured time condition is above the preliminary time condition configured by the personal communication system.

In an embodiment, the personal communication system receives recipient defined time parameters from a recipient device and adds the received recipient defined time parameters to the configured preliminary time condition to generate the recipient configured time condition. As used herein, "recipient defined time parameters" refer to a duration of time, for example, in minutes, seconds, etc., provided by a recipient to increase the minimum time defined in the preliminary time condition for composition of a personalized communication by a sender. Also, as used herein, "recipient configured time condition" refers to time based criteria or a time based rule that is generated by adding a minimum time specified by a recipient that he or she requires a sender to devote for composing a personalized communication for the recipient, to the minimum time defined in the preliminary time condition configured by the personal communication system. The recipient configured time condition comprises the recipient defined time parameters added to the minimum time defined in the configured preliminary time condition. For example, the personal communication system allows a recipient to increase the minimum time from 72 seconds to a higher value by adding the recipient defined time parameters to the minimum time of 72 seconds. The recipient configured time condition defines a time requirement of a specific recipient for whom a personalized communication is intended. The recipient configured time condition is above the preliminary time condition configured by the personal communication system. The personal communication system allows a recipient to change the time setting requirement defined in the preliminary time condition, to configure a time condition that defines a minimum time requirement of what duration of personalized communications the recipient wishes to receive from a sender.

The personal communication system determines 102 an optimal time condition selected from the configured preliminary time condition, the sender configured time condition, and the recipient configured time condition. As used herein, "optimal time condition" refers to time based criteria or a time based rule that defines a minimum time required for composing a personalized communication based on a preliminary time condition configured by the personal communication system or time parameters defined by a sender and/or a recipient. The personal communication system displays the determined optimal time condition on the sender device and/or the recipient device via the GUI. In an embodiment, the optimal time condition is a greater one of the configured preliminary time condition, the sender configured time condition, and the recipient configured time condition. That is, the optimal time condition is established from the highest amount of time among the three variables comprising the configured preliminary time condition, the sender configured time condition, and the recipient configured time condition.

Consider an example where the personal communication system configures a preliminary time condition for composing a personalized communication. If a sender of the personalized communication wishes to increase the minimum time defined in the preliminary time condition, then the sender provides sender defined time parameters via a settings interface on the GUI. The personal communication system then generates a sender configured time condition based on the sender defined time parameters received from the sender device. The sender configured time condition takes precedence over the preliminary time condition. If the sender wishes to send a personalized communication to a recipient, for example, as a private message or a digital communication, then the optimal time condition for composing the personalized communication could potentially be higher than the sender configured time condition based on a recipient configured time condition generated by the personal communication system. In this example, the recipient provides recipient defined time parameters that define a minimum time that is higher than the minimum time defined in the sender configured time condition, via the settings interface on the GUI. Hence, in this example, the highest time setting, that is, the recipient configured time condition establishes the optimal time condition for composing the personalized communication.

In an embodiment, if a sender of a digital personalized communication writes to a specific recipient of the digital personalized communication via the GUI of the personal communication system, then the personal communication system delivers the digital personalized communication to the recipient depending on the optimal time condition determined by the personal communication system. The personal communication system determines the optimal time condition from the minimum time defined in the preliminary time condition, or the minimum time defined in the sender configured time condition, or the minimum time defined in the recipient configured time condition, as a time filter that specifies a large amount of time for composing the digital personalized communication, thereby ensuring more meaningful and quality communication. A recipient may, for example, define 2 minutes as the minimum time in the recipient configured time condition, based on which the recipient will receive or accept a digital personalized communication from the personal communication system. The minimum time defined by the recipient then becomes a variable that determines a sender's clock time requirements when the sender wishes to deliver the digital personalized communication to that recipient. If the preliminary time condition configured by the personal communication system is 1 minute and 12 seconds, the personal communication system determines that the optimal time condition is 2 minutes, as the recipient configured time condition is greater than the configured preliminary time condition. The personal communication system therefore determines an optimal time condition for composing a personalized communication based on inputs received from both the sender of the personalized communication and the intended recipient of the personalized communication, with the intended goal of making the composition of the digital personalized communication more meaningful and time efficient.

The optimal time condition defines a minimum time requirement for composing a personalized communication and delivering or publishing the personalized communication. The optimal time condition is established from a greater one of the sender configured time condition of the sender of the personalized communication based on personal writing settings, the configured preliminary time condition displayed on the GUI of the personal communication system, or the recipient configured time condition established by a recipient of the intended personalized communication. In an embodiment, a recipient of the personalized communication may set a time requirement by which the recipient will allow the personalized communication to be delivered to him or her, if the personalized communication is composed by the sender for at least the set time requirement. Once inputted by the recipient via the GUI of the personal communication system, this time requirement preference setting becomes one of the input variables that affects the minimum standard for a sender to compose and deliver a personalized communication to that recipient. Once a sender composes a personalized communication for the minimum time requirement defined in the optimal time condition or beyond the minimum time requirement defined in the optimal time condition, the personal communication system allows the sender of the personalized communication to either send the personalized communication to a recipient privately or to publish the personalized communication publicly via the GUI of the personal communication system.

In an embodiment, the personal communication system filters personalized communications that do not meet the determined optimal time condition and excludes the filtered personalized communications from delivery to one or more recipient devices. The recipient configured time condition allows the recipient to create a filter for receiving personalized communications from a sender. The personal communication system filters out any personalized communication that is not composed above the minimum time defined in the recipient configured time condition. Hence, the recipient does not receive any personalized communications unless the recipient configured time condition to receive the personalized communications is met. Consider an example where a user, for example, a popular personality or a public figure wishes to receive only quality personalized communication from his/her fans. The user registers with the personal communication system to encourage people to dedicate more time to their personalized communications with him/her. If the user wishes to receive personalized communications that have been composed for 20 minutes and above, the user provides recipient defined time parameters via the GUI of the personal communication system to allow the personal communication system to generate the recipient configured time condition as 20 minutes. The personal communication system generates the recipient configured time condition as 20 minutes, for example, by adding the recipient defined parameters to the minimum time defined in the preliminary time condition configured by the personal communication system. The personal communication system then delivers only those personal communications that were composed for 20 minutes or more than 20 minutes to the recipient. Therefore, any fan who writes a personalized communication to the user must dedicate at least 20 minutes to their personalized communication in order for the user to receive the personalized communication from the personal communication system.

In an embodiment, the personal communication system displays a running timer on the sender device via the GUI during the composition of the personalized communication. In an embodiment, the running timer counts up from zero to the minimum time defined in the determined optimal time condition and continues keeping time or running during the composition of the personalized communication until the completion of the composition of the personalized communication. In another embodiment, the running timer counts down from the minimum time defined in the determined optimal time condition to zero during the composition of the personalized communication. The timed based personal communication is therefore accomplished with the running timer that counts down from the minimum time to zero or counts up from zero to the minimum time, as a means to generate a personalized communication that has been composed with the optimal time condition as determined by the personal communication system.

A sender provides media content for generating the personalized communication, for example, by writing, dictating, typing, drawing, audio recording, video recording, etc., a personalized communication on the GUI of the personal communication system. The personal communication system receives 103 the media content from the sender device via the GUI. The media content comprises, for example, one or more of gesture content, textual content, image content, audio content, video content, audiovisual content, multimedia content, animations, digital content, electronic mail (email) content, messaging content, voicemail content, document content, social media content such as "likes", "tweets", etc. The personal communication system detects 104 an attempt by the sender to generate and send the personalized communication based on the received media content.

The personal communication system times 105 the composition of the personalized communication on detection of the attempt to generate and send the personalized communication based on the received media content. In an embodiment, the personal communication system generates 106 a timing verification report based on the timing for verifying whether the determined optimal time condition is met. The timing verification report comprises a comparison of the total time devoted by the sender for composing the personalized communication with the optimal time condition. The personal communication system verifies whether the total time determined in the timing verification report is equal to or above the minimum time defined in the determined optimal time condition, thereby verifying whether the determined optimal time condition is met. For example, if the determined optimal time condition is 72 seconds, the personal communication system checks whether the sender has devoted at least 72 seconds to compose the personalized communication based on the timing verification report generated by the personal communication system.

The personal communication system performs 107 an action based on the verification indicated in the generated timing verification report. For example, the personal communication system renders 107a a notification to the sender device for instructing the sender to continue composing the personalized communication until the determined optimal time condition is met, or generates 107b the personalized communication based on the received media content and delivers the generated personalized communication to one or more recipient devices when the determined optimal time condition is met. The personal communication system generates, for example, an audio based personalized communication such as a recorded audio message, or a video based personalized communication such as a recorded video message based on the type of media content provided by the sender, when the determined optimal time condition is met.

In an embodiment, the personal communication system maintains a time stamp for each generated personalized communication composed by a sender for indicating time devoted by the sender for each generated personalized communication. The time stamps allow the sender to view and reflect on the time devoted by the sender to compose personalized communications. In an embodiment, the personal communication system calculates and displays a total time devoted by the sender for composing one or more personalized communications on the GUI.

Consider an example where the personal communication system configures a preliminary time condition of 72 seconds for composing a personalized communication. If the sender has not devoted at least 72 seconds to compose the personalized communication and proceeds to submit the composed personalized communication to the personal communication system, the personal communication system displays a notification instructing the sender to continue composing the personalized communication until 72 seconds has lapsed. If the sender has devoted 72 seconds or more to compose the personalized communication and then proceeds to submit the composed personalized communication to the personal communication system, the personal communication system generates the personalized communication and delivers the personalized communication to one or more recipient devices.

Consider another example where a sender wishes to send a personalized communication in the form of a digitally signed digital message to a recipient. The sender using a laptop, or a mobile phone, or a tablet device registers and logs in to the personal communication system via a GUI provided by the personal communication system. The personal communication system configures a preliminary time condition defining a minimum time of 1 minute and 12 seconds for composing the digital message. The personal communication system displays a pop up notification message on the GUI indicating that the sender needs to spend a minimum writing time of about 1 minute and 12 seconds for composing the digital message. The personal communication system also generates a recipient configured time condition based on recipient defined time parameters received from the recipient via the GUI. The recipient defines in the recipient configured time condition that the recipient wants the sender to devote about 4 minutes for composing the digital message.

The personal communication system displays the minimum time of 1 minute and 12 seconds defined in the preliminary time condition configured by the personal communication system and the minimum time of 4 minutes defined in the recipient configured time condition on the GUI. However, the sender wishes to spend more time to compose the digital message. The personal communication system receives sender defined time parameters from the sender via the GUI and generates the sender configured time condition. The sender configured time condition defines a minimum time of 5 minutes. The personal communication system selects the greater one of the configured preliminary time condition, the recipient configured time condition, and the sender configured time condition as the optimal time condition and displays the optimal time condition of 5 minutes on the GUI.

The personal communication system displays a running timer on the GUI that counts down from 5 minutes to zero. The personal communication system receives images, text messages, audio data, video data, etc., from the sender's laptop, mobile phone, or tablet device for composing the digital message via a network, for example, the internet. The sender completes composing the digital message by about 4 minutes. The personal communication system prompts the sender with a pop up notification message indicating that the sender should spend the remaining 1 minute for further composing and reviewing the composed digital message. Once the sender meets the optimal time condition of 5 minutes, the personal communication system receives the composed digital message, for example, with images, digital attachments of audio data or video data, etc., and generates a personalized digital message. The personal communication system delivers the generated personalized digital message to the recipient and displays the generated personalized digital message to the recipient via the GUI. The personal communication system notifies the sender of a successful delivery of the personalized digital message to the recipient, via the GUI.

Disclosed below are example computer program codes executed by the personal communication system, for example, using a Ruby on Rails® application framework for generating and delivering a personalized communication based on a time condition.

A Ruby on Rails® implementation of a code snippet from a computer program code executed by the personal communication system for configuring a preliminary time condition that stops a sender from composing a personalized communication too fast:

```
class ProjectSetting
    field :minimum_writing_duration, type: Integer, default: 72
    after_update :change_minimum_writing_duration
  end
  # If global minimum_writing_duration increase, the sender's
  minimum time should
reflect the global minimum time
    def change_minimum_writing_duration
        if minimum_writing_duration_changed? &&
        minimum_writing_duration_was <
minimum_writing_duration
            User.where(:minimum_writing_duration.lt =>
minimum_writing_duration).set(:minimum_writing_duration,
minimum_writing_duration)
        end
    end
```

Disclosed below is a Ruby on Rails® implementation of a code snippet from a computer program code executed by the personal communication system for generating the sender configured time condition based on sender defined time parameters received from the sender to add time to the preliminary time condition configured by the personal communication system:

```
class User
field :minimum_writing_duration, type: Integer
validate :minimum_writing_duration_cannot_be_less_than_global
    end
    def minimum_writing_duration_cannot_be_less_than_global
        if minimum_writing_duration.present?
            if minimum_writing_duration <
            ProjectSetting.current.minimum_writing_duration
                errors.add(:minimum_writing_duration, "can't be less
                than global value")
            end
        end
    end
```

Disclosed below is a Ruby on Rails® implementation of a code snippet from a computer program code executed by the personal communication system for performing an action based on whether the preliminary time condition configured by the personal communication system is met:

```
module Concerns::Letter::WritingTimer
extend ActiveSupport::Concern
included do
    field :writing_time, type: Integer, default: 0
    has_many :writing_time_logs, dependent::nullify
    accepts_nested_attributes_for :writing_time_logs, :reject_if =>
:reject_writing_time_logs
end
# NOTICE: When new writing time log's start_at is less than or equal to
the last writing_time_log's end_at, then should merge and reject it
def reject_writing_time_logs(attributes)
    return true if attributes ['start_at'].blank? ||
    attributes['end_at'].blank?
    begin
        attributes ['start_at'] =
        DateTime.parse(attributes['start_at']).getutc
        attributes ['end_at'] =
        DateTime.parse(attributes['end_at']).getutc
        rescue ArgumentError # Reject the invalid date formats
            return true
    end
    return true if attributes ['start_at'] >= attributes['end_at']
    wt = writing_time_logs.last
```

```
    return false if wt.blank?
    if wt.end_at >= attributes ['start_at']
        old_duration = wt.duration
        wt.end_at = attributes ['end_at']
        d = wt.duration - old_duration
        wt.letter.inc(:writing_time, d)
        wt.save
        return true
    else
        return false
    end
end
def minimum_writing_duration(global_minimum_writing_duration=nil)
    if author.present?
        author.real_minimum_writing_duration
    else
        global_minimum_writing_duration ||
ProjectSetting.current.minimum_writing_duration
    end
end
def minimum_writing_duration_exceeded?
    writing_time >= minimum_writing_duration
end
def should_exceed_minimum_writing_duration
    unless minimum_writing_duration_exceeded?
        errors.add(:writing_time, "should large than the default minimum writing duration")
    end
end
def writing_time_in_words
    [ writing_time / 3600, (writing_time / 60) % 60,
    writing_time % 60 ].map{ |t|
t.to_s.rjust(2, '0') }.join(':')
    end
end
```

Disclosed below is a Ruby on Rails® implementation of a code snippet from a computer program code executed by the personal communication system for generating the recipient configured time condition based on recipient defined time parameters received from the recipient to add time to the preliminary time condition configured by the personal communication system:

```
class ProjectSetting
    field :minimum_writing_duration_for_recipient, type: Integer, default: 72
    after_update :change_minimum_writing_duration_for_recipient
end
def change_minimum_writing_duration_for_recipient
    if minimum_writing_duration_for_recipient_changed? &&
minimum_writing_duration_for_recipient_was <
minimum_writing_duration_for_recipient
        User.where(:minimum_writing_duration_for_recipient.lt =>
minimum_writing_duration_for_recipient).set(:minimum_writing_duration_for_recipient
, minimum_writing_duration_for_recipient)
        end
    end
    class User
field :minimum_writing_duration_for_recipient, type: Integer
validate :minimum_writing_duration_for_recipient_cannot_be_less_than_global
end
    def minimum_writing_duration_for_recipient_cannot_be_less_than_global
        if minimum_writing_duration_for_recipient.present?
            if minimum_writing_duration_for_recipient <
ProjectSetting.current.minimum_writing_duration_for_recipient
                errors.add(:minimum_writing_duration_for_recipient, "can't be less than global value")
            end
        end
    end
    module Concerns::Letter::WritingTimer
    extend ActiveSupport::Concern
    included do
        field :writing_time_for_recipient, type: Integer, default: 0
        accepts_nested_attributes_for :writing_time_for_recipient_logs, :reject_if =>
:reject_writing_for_recipient_time_logs
    end
    # NOTICE: When new writing time log's start_at is less than or equal to the last
writing_time_log's end_at, then should merge and reject it
    def reject_writing_for_recipient_time_logs(attributes)
        return true if attributes ['start_at_for_recipient'].blank? ||
attributes ['end_at_for_recipient'].blank?
        begin
            attributes ['start_at_for_recipient'] =
DateTime.parse(attributes['start_at_for_recipient']).getutc
            attributes['end_at_for_recipient'] =
DateTime.parse(attributes['end_at_for_recipient']).getutc
        rescue ArgumentError # Reject the invalid date formats
            return true
        end
        return true if attributes['start_at_for_recipient'] >= attributes['end_at_for_recipient']
        wt = writing_time_for_recipient_logs.last
        return false if wt.blank?
        if wt.end_at >= attributes ['start_at_for_recipient']
            old_duration = wt.duration
            wt.end_at = attributes ['end_at_for_recipient']
            d = wt.duration - old_duration
```

```
                wt.letter.inc(:writing_time_for_recipient, d)
                wt.save
                return true
            else
                return false
            end
        end
        def
minimum_writing_duration_for_recipient(global_minimum_writing_duration_for_recipi
ent=nil)
            if author.present?
                author.real_minimum_writing_duration_for_recipient
            else
                global_minimum_writing_duration_for_recipient ||
ProjectSetting.current.minimum_writing_duration_for_recipient
            end
        end
        def minimum_writing_duration_for_recipient_exceeded?
            writing_time_for_recipient >= minimum_writing_duration_for_recipient
        end
        def should_exceed_minimum_writing_durationfor_recipient
            unless minimum_writing_duration_for_recipient_exceeded?
                errors.add(:writing_time_for_recipient, "should large than the default minimum
writing duration for recipient")
            end
        end
end
```

Figure 2:
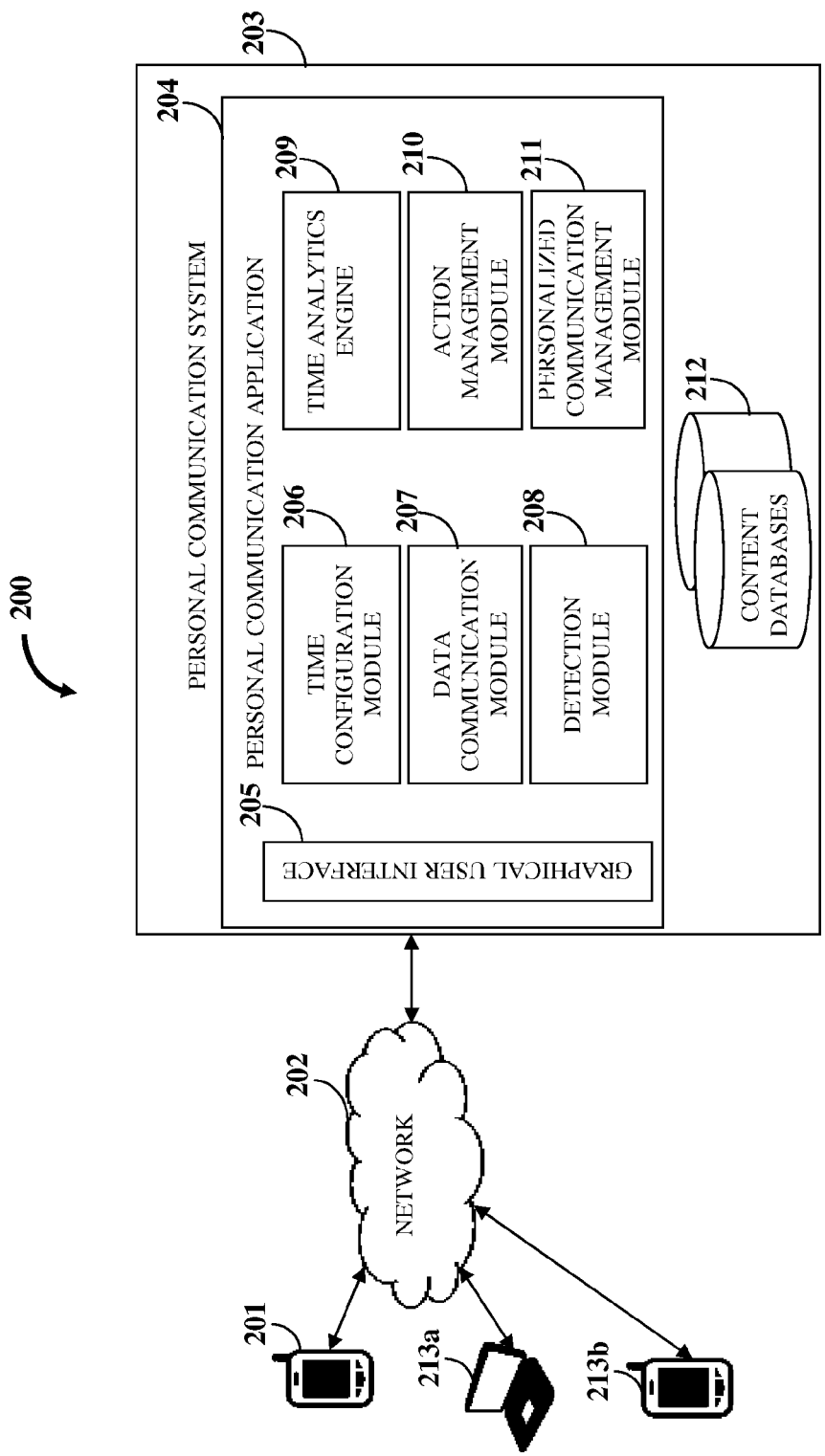
FIG. 2 exemplarily illustrates a computer implemented system for generating and delivering a personalized communication based on a time condition.

FIG. 2 exemplarily illustrates a computer implemented system 200 for generating and delivering a personalized communication based on a time condition. The computer implemented system 200 disclosed herein comprises the personal communication system 203 accessible by a sender device 201 and one or more recipient devices 213a and 213b via a network 202. The personal communication system 203 is accessible to sender devices 201 and recipient devices 213a and 213b, for example, through a broad spectrum of technologies and devices such as personal computers with access to the internet, internet enabled cellular phones, tablet computing devices, smart glasses, etc. The sender device 201 and the recipient devices 213a and 213b can be linear electronic devices or non-linear electronic devices, for example, personal computers, tablet computing devices, mobile computers, mobile phones, smart phones, portable computing devices, laptops, personal digital assistants, wearable devices such as Google Glass™ of Google Inc., Apple Watch™ of Apple Inc., etc., touch centric devices, workstations, client devices, portable electronic devices, network enabled computing devices, interactive network enabled communication devices, any other suitable computing equipment, and combinations of multiple pieces of computing equipment. The network 202 for accessing the personal communication system 203 is, for example, the internet, an intranet, a wired network, a wireless network, a communication network, a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a long-term evolution (LTE) mobile communication network, a public telephone network, etc., a local area network, a wide area network, an internet connection network, an infrared communication network, etc., or a network formed from any combination of these networks.

In an embodiment, the personal communication system 203 is configured as a web based platform, for example, a website hosted on a server or a network of servers. In another embodiment, the personal communication system 203 is configured as a software application downloadable and usable on the sender device 201 and each of the recipient devices 213a and 213b. In another embodiment, the personal communication system 203 is implemented in a cloud computing environment and provides an open communication community service. As used herein, "cloud computing environment" refers to a processing environment comprising configurable computing physical and logical resources, for example, networks, servers, storage, applications, services, etc., and data distributed over a network 202, for example, the internet. The cloud computing environment provides on-demand network access to a shared pool of the configurable computing physical and logical resources. The personal communication system 203 is developed, for example, using the Google App engine cloud infrastructure of Google Inc., the Amazon Web Services® of Amazon Technologies, Inc., the Amazon elastic compute cloud EC2® web service of Amazon Technologies, Inc., the Android platform of Google Inc., used for developing, for example, the Google Play™ platform of Google, Inc., the iOS platform of Apple Inc., used for developing, for example, the iTunes® media library and mobile device management application, the Google® Cloud platform of Google Inc., the Microsoft® Cloud platform of Microsoft Corporation, etc. In an embodiment, the personal communication system 203 is configured as a cloud computing based platform implemented as a service for enabling time based personalized communication, for example, by generating and delivering a personalized communication based on a time condition.

The personal communication system 203 disclosed herein comprises a non-transitory computer readable storage medium and at least one processor communicatively coupled to the non-transitory computer readable storage medium. As used herein, "non-transitory computer readable storage medium" refers to all computer readable media, for example, non-volatile media such as optical discs or magnetic disks, volatile media such as a register memory, a processor cache, etc., and transmission media such as wires that constitute a system bus coupled to the processor, except for a transitory, propagating signal. The non-transitory computer readable storage medium is configured to store computer program instructions defined by modules, for example, 206, 207, 208, 209, 210, 211, etc., of the personal communication system 203. The processor is configured to execute the defined computer program instructions.

In an embodiment, the personal communication system 203 further comprises a personal communication application 204 that is configured and coded as a mobile application. The personal communication application 204 is developed to operate within mobile application marketplaces such as iTunes® of Apple Inc., and Google Play™ of Google, Inc. The personal communication application 204 comprises a graphical user interface (GUI) 205. A sender or a recipient can access the personal communication application 204 via the GUI 205. The GUI 205 is, for example, a webpage of a website hosted by the personal communication system 203, an online web interface, a web based downloadable application interface, a mobile based downloadable application interface, etc. The GUI 205 of the personal communication application 204 is interoperable with a web based version of the personal communication system 203. The personal communication application 204 further comprises a time configuration module 206, a data communication module 207, a detection module 208, a time analytics engine 209, an action management module 210, and a personalized communication management module 211. The time configuration module 206 configures a preliminary time condition that defines a minimum time required for composing a personalized communication. The personal communication application 204 downloaded on the sender device 201 and/or the recipient devices 213a and 213b displays the configured preliminary time condition on the sender device 201 and/or the recipient devices 213a and 213b via the GUI 205.

In an embodiment, the data communication module 207 receives sender defined time parameters from the sender device 201. The time configuration module 206 adds the received sender defined time parameters to the configured preliminary time condition to generate a sender configured time condition. In an embodiment, the data communication module 207 receives recipient defined time parameters from each of the recipient devices 213a and 213b. The time configuration module 206 adds the received recipient defined time parameters to the configured preliminary time condition to generate a recipient configured time condition. The time configuration module 206 determines an optimal time condition from the configured preliminary time condition, the sender configured time condition, and the recipient configured time condition. For example, the time configuration module 206 determines a greater one of the configured preliminary time condition, the sender configured time condition, and the recipient configured time condition as the optimal time condition. The personal communication application 204 displays the determined optimal time condition on the sender device 201 via the GUI 205.

The data communication module 207 receives media content from the sender device 201 via the GUI 205 and stores the received media content in one or more content databases 212 of the personal communication system 203. The detection module 208 detects an attempt by the sender to generate and send the personalized communication based on the received media content. In an embodiment, the GUI 205 displays a running timer that count up from zero to the determined optimal time condition or counts down from the determined optimal time condition to zero on the sender device 201 during the composition of the personalized communication. The time analytics engine 209 times the composition of the personalized communication on detection of the attempt to generate and send the personalized communication based on the received media content. The time analytics engine 209 generates a timing verification report based on the timing for verifying whether the determined optimal time condition is met. The action management module 210 performs an action based on the verification indicated in the generated timing verification report. The action management module 210 transmits instructions to the data communication module 207 or the personalized communication management module 211 to perform the action.

The data communication module 207 renders a notification to the sender device 201 for instructing the sender to continue composing the personalized communication until the determined optimal time condition is met. The personalized communication management module 211 generates the personalized communication based on the received media content and delivers the generated personalized communication to one or more recipient devices 213a and 213b, when the determined optimal time condition is met. In an embodiment, the personalized communication management module 211 filters personalized communications that do not meet the determined optimal time condition and excludes the filtered personalized communications from delivery to one or more recipient devices 213a and 213b. In an embodiment, the time analytics engine 209 maintains a time stamp for each generated personalized communication for indicating time devoted by the sender for each generated personalized communication. In another embodiment, the time analytics engine 209 calculates a total time devoted by the sender for composing one or more personalized communications. The GUI 205, in communication with the time analytics engine 209, displays the calculated total time on the sender device 201.

Figure 3:
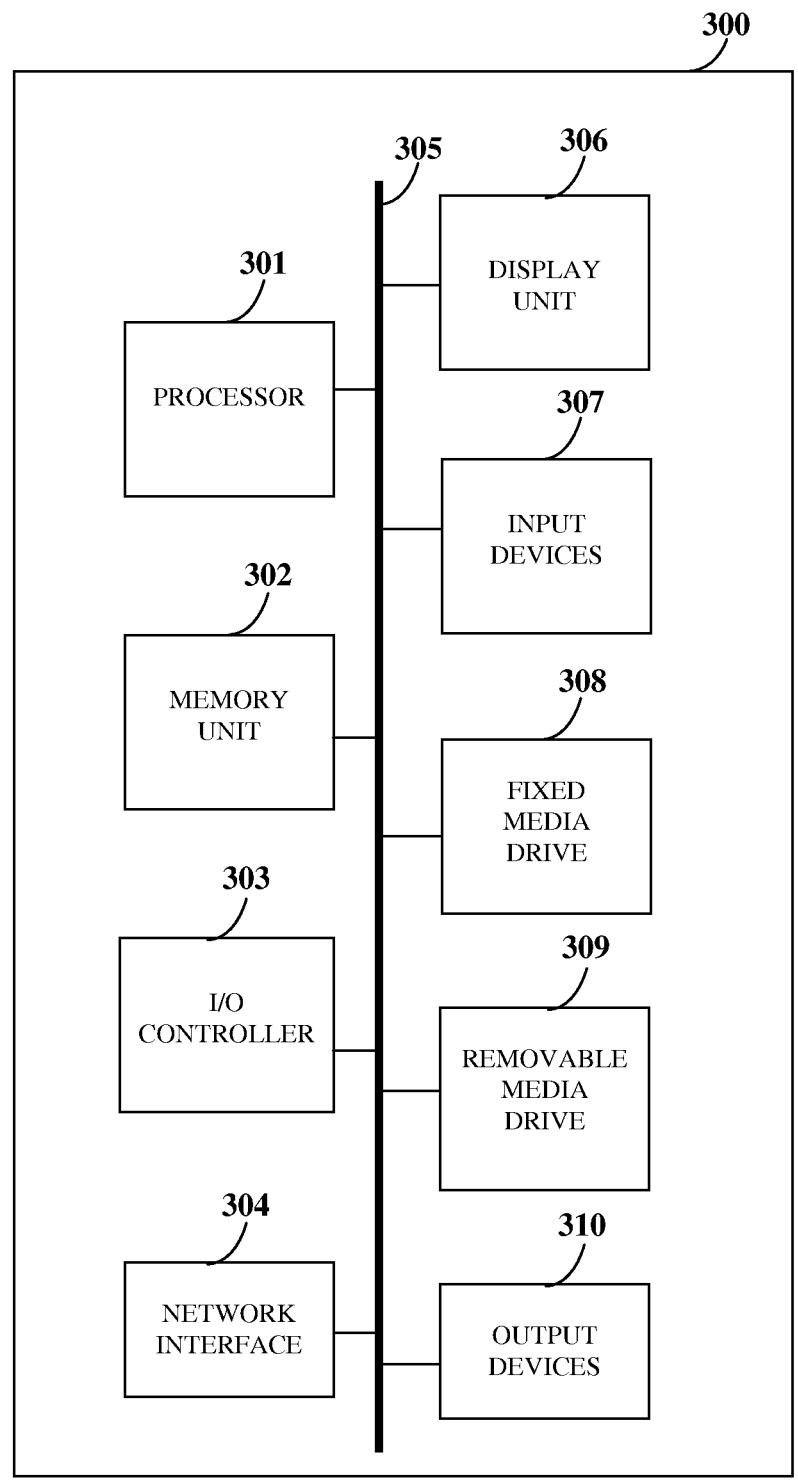
FIG. 3 exemplarily illustrates the architecture of a computer system employed by a personal communication system for generating and delivering a personalized communication based on a time condition.

FIG. 3 exemplarily illustrates the architecture of a computer system 300 employed by the personal communication system 203 for generating and delivering a personalized communication based on a time condition. The personal communication system 203 of the computer implemented system 200 exemplarily illustrated in FIG. 2, employs the architecture of the computer system 300 exemplarily illustrated in FIG. 3. The computer system 300 is programmable using a high level computer programming language. The computer system 300 may be implemented using programmed and purposeful hardware. The personal communication system 203 communicates with a sender device 201, recipient devices 213a and 213b, etc., registered with the personal communication system 203 via a network 202 exemplarily illustrated in FIG. 2, for example, a short range network or a long range network.

As exemplarily illustrated in FIG. 3, the computer system 300 comprises a processor 301, a non-transitory computer readable storage medium such as a memory unit 302 for storing programs and data, an input/output (I/O) controller 303, a network interface 304, a data bus 305, a display unit 306, input devices 307, a fixed media drive 308 such as a hard drive, a removable media drive 309 for receiving removable media, output devices 310, etc. The processor 301 refers to any one or more microprocessors, central processing unit (CPU) devices, finite state machines, computers, microcontrollers, digital signal processors, logic, a logic device, an electronic circuit, an application specific integrated circuit (ASIC), a field-programmable gate array (FPGA), a chip, etc., or any combination thereof, capable of executing computer programs or a series of commands, instructions, or state transitions. The processor 301 may also be implemented as a processor set comprising, for example, a general purpose microprocessor and a math or graphics co-processor. The processor 301 is selected, for example, from the Intel® processors such as the Itanium® microprocessor or the Pentium® processors, Advanced Micro Devices (AMD®) processors such as the Athlon® processor, UltraSPARC® processors, microSPARC® processors, Hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The personal communication system 203 disclosed herein is not limited to a computer system 300 employing a processor 301. The computer system 300 may also employ a controller or a microcontroller. The processor 301 executes the modules, for example, 206, 207, 208, 209, 210, 211, etc., of the personal communication system 203.

The memory unit 302 is used for storing programs, applications, and data. For example, the time configuration module 206, the data communication module 207, the detection module 208, the time analytics engine 209, the action management module 210, the personalized communication management module 211, etc., of the personal communication system 203 are stored in the memory unit 302 of the computer system 300. The memory unit 302 is, for example, a random access memory (RAM) or another type of dynamic storage device that stores information and instructions for execution by the processor 301. The memory unit 302 also stores temporary variables and other intermediate information used during execution of the instructions by the processor 301. The computer system 300 further comprises a read only memory (ROM) or another type of static storage device that stores static information and instructions for the processor 301. The I/O controller 303 controls input actions and output actions performed by the personal communication system 203.

The network interface 304 enables connection of the computer system 300 to the network 202. For example, the personal communication system 203 connects to the network 202 via the network interface 304. In an embodiment, the network interface 304 is provided as an interface card also referred to as a line card. The network interface 304 comprises, for example, one or more of an infrared (IR) interface, an interface implementing Wi-Fi®, a universal serial bus (USB) interface, a FireWire® interface of Apple, Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, and Ethernet communication interfaces, asynchronous transfer mode (ATM) interfaces, a high speed serial interface (HSSI), a fiber distributed data interface (FDDI), interfaces based on transmission control protocol (TCP)/internet protocol (IP), interfaces based on wireless communications technologies such as satellite technology, radio frequency (RF) technology, near field communication, etc. The data bus 305 permits communications between the modules, for example, 205, 206, 207, 208, 209, 210, 211, 212, etc., of the personal communication system 203.

The display unit 306, via the graphical user interface (GUI) 205 exemplarily illustrated in FIG. 2, displays information, display interfaces, user interface elements such as text fields, checkboxes, text boxes, windows, etc., for allowing a sender or a recipient to provide media content such as textual content, audio content, video content, multimedia content, animations, etc., for allowing viewing of a personalized communication generated by the personal communication system 203 based on the media content, etc. The display unit 306 comprises, for example, a liquid crystal display, a plasma display, an organic light emitting diode (OLED) based display, etc. The input devices 307 are used for inputting data into the computer system 300. An administrator of the personal communication system 203 uses input devices 307 to provide inputs to the personal communication system 203. For example, the administrator can set a minimum time using the input devices 307 for configuring a preliminary time condition for a sender to compose a personalized communication. In another example, the administrator can enter notification content using the input devices 307 for instructing a sender to continue composing a personalized communication. The input devices 307 are, for example, a keyboard such as an alphanumeric keyboard, a microphone, a joystick, a pointing device such as a computer mouse, a touch pad, a light pen, a physical button, a touch sensitive display device, a track ball, a pointing stick, any device capable of sensing a tactile input, etc.

Computer applications and programs are used for operating the computer system 300. The programs are loaded onto the fixed media drive 308 and into the memory unit 302 of the computer system 300 via the removable media drive 309. In an embodiment, the computer applications and programs may be loaded directly via the network 202. Computer applications and programs are executed by double clicking a related icon displayed on the display unit 306 using one of the input devices 307. The output devices 310 output the results of operations performed by the personal communication system 203. For example, the personal communication system 203 provides the timing verification reports, customized reports based on time stamps for each generated personalized communication, customized reports based on a total time devoted by each sender for composing one or more personalized communications, etc., using the output devices 310. The personal communication system 203 displays the reports using the output devices 310.

The processor 301 executes an operating system, for example, the Linux® operating system, the Unix® operating system, any version of the Microsoft® Windows® operating system, the Mac OS of Apple Inc., the IBM® OS/2, VxWorks® of Wind River Systems, Inc., QNX Neutrino® developed by QNX Software Systems Ltd., Palm OS®, the Solaris operating system developed by Sun Microsystems, Inc., the Android operating system, the Windows Phone® operating system of Microsoft Corporation, the BlackBerry® operating system of Blackberry Limited, the iOS operating system of Apple Inc., the Symbian™ operating system of Symbian Foundation Limited, etc. The computer system 300 employs the operating system for performing multiple tasks. The operating system is responsible for management and coordination of activities and sharing of resources of the computer system 300. The operating system further manages security of the computer system 300, peripheral devices connected to the computer system 300, and network connections. The operating system employed on the computer system 300 recognizes, for example, inputs provided by the users such as an administrator using one of the input devices 307, the output display, files, and directories stored locally on the fixed media drive 308. The operating system on the computer system 300 executes different programs using the processor 301. The processor 301 and the operating system together define a computer platform for which application programs in high level programming languages are written.

The processor 301 of the computer system 300 employed by the personal communication system 203 retrieves instructions defined by the time configuration module 206, the data communication module 207, the detection module 208, the time analytics engine 209, the action management module 210, the personalized communication management module 211, etc., of the personal communication system 203 for performing respective functions disclosed in the detailed description of FIG. 2. The processor 301 retrieves instructions for executing the modules, for example, 206, 207, 208, 209, 210, 211, etc., of the personal communication system 203 from the memory unit 302. A program counter determines the location of the instructions in the memory unit 302. The program counter stores a number that identifies the current position in the program of each of the modules, for example, 206, 207, 208, 209, 210, 211, etc., of the personal communication system 203. The instructions fetched by the processor 301 from the memory unit 302 after being processed are decoded. The instructions are stored in an instruction register in the processor 301. After processing and decoding, the processor 301 executes the instructions, thereby performing one or more processes defined by those instructions.

At the time of execution, the instructions stored in the instruction register are examined to determine the operations to be performed. The processor 301 then performs the specified operations. The operations comprise arithmetic operations and logic operations. The operating system performs multiple routines for performing a number of tasks required to assign the input devices 307, the output devices 310, and memory for execution of the modules, for example, 206, 207, 208, 209, 210, 211, etc., of the personal communication system 203. The tasks performed by the operating system comprise, for example, assigning memory to the modules, for example, 206, 207, 208, 209, 210, 211, etc., of the personal communication system 203, and to data used by the personal communication system 203, moving data between the memory unit 302 and disk units, and handling input/output operations. The operating system performs the tasks on request by the operations and after performing the tasks, the operating system transfers the execution control back to the processor 301. The processor 301 continues the execution to obtain one or more outputs. The outputs of the execution of the modules, for example, 206, 207, 208, 209, 210, 211, etc., of the personal communication system 203 are displayed on the display unit 306, for example, to an administrator of the personal communication system 203.

For purposes of illustration, the detailed description refers to the personal communication system 203 being run locally on the computer system 300; however the scope of the computer implemented method and system 200 disclosed herein is not limited to the personal communication system 203 being run locally on the computer system 300 via the operating system and the processor 301, but may be extended to run remotely over the network 202 by employing a web browser and a remote server, a mobile phone, or other electronic devices. One or more portions of the computer system 300 may be distributed across one or more computer systems (not shown) coupled to the network 202.

Disclosed herein is also a computer program product comprising a non-transitory computer readable storage medium that stores computer program codes comprising instructions executable by at least one processor 301 for generating and delivering a personalized communication based on a time condition. The computer program product comprises a first computer program code for configuring a preliminary time condition that defines a minimum time required for composing a personalized communication; a second computer program code for determining an optimal time condition from the configured preliminary time condition, the sender configured time condition, and the recipient configured time condition; a third computer program code for receiving media content from a sender device 201; a fourth computer program code for detecting an attempt by a sender to generate and send the personalized communication based on the received media content; a fifth computer program code for timing the composition of the personalized communication on detection of the attempt to generate and send the personalized communication based on the received media content; a sixth computer program code for generating a timing verification report based on the timing for verifying whether the determined optimal time condition is met; and a seventh computer program code for performing an action based on the verification indicated in the generated timing verification report. The seventh computer program code comprises an eighth computer program code for rendering a notification to the sender device 201 for instructing the sender to continue composing the personalized communication until the determined optimal time condition is met, and a ninth computer program code for generating the personalized communication based on the received media content and delivering the generated personalized communication to one or more recipient devices 213a and 213b, when the determined optimal time condition is met.

The computer program product disclosed herein further comprises one or more additional computer program codes for performing additional steps that may be required and contemplated for generating and delivering a personalized communication based on a time condition. In an embodiment, a single piece of computer program code comprising computer executable instructions performs one or more steps of the computer implemented method disclosed herein for generating and delivering a personalized communication based on a time condition. The computer program codes comprising computer executable instructions are embodied on the non-transitory computer readable storage medium. The processor 301 of the computer system 300 retrieves these computer executable instructions and executes them. When the computer executable instructions are executed by the processor 301, the computer executable instructions cause the processor 301 to perform the steps of the computer implemented method for generating and delivering a personalized communication based on a time condition.

FIGS. 4A-4M exemplarily illustrate screenshots of a graphical user interface (GUI) 205 provided by the personal communication system 203 exemplarily illustrated in FIG. 2, for generating and delivering a personalized communication based on a time condition. The personal communication system 203 provides multiple interface sections, for example, a write interface section 401 configured to enable writing and delivery of a personalized communication as exemplarily illustrated in FIGS. 4A-4B. The write interface section 401 is configured, for example, as a writing desk. The write interface section 401 provides links for digital and/or physical customization of a personalized communication. The write interface section 401 provides links, for example, for delivery of seasonal gift items along with a personalized communication, a list of digital themes, a list of fonts, a list of font colors, ink stamp options, handwritten tagline options, proofreading options, design consultation options, an option to add a personalized communication to a sender's or a recipient's favorite personalized communications collection, an option to draft a personalized communication, an option to deliver a personalized communication, an option to change a clock type, or set time parameters, or change clock settings, etc., as exemplarily illustrated in FIGS. 4A-4B. In an embodiment, the personal communication system 203 provides an option of integrating a personalized communication with one or more social networking platforms, for example, Facebook® of Facebook, Inc., Linkedin® of Linkedin Corporation, MySpace® of MySpace Inc., Orkut® of Google, Inc., Hi5® of Hi5 Networks, Inc., Ning® of Ning, Inc., Elgg and social network aggregation applications such as NutshellMail, FriendFeed® of Facebook, Inc., etc.

Figure 4A:
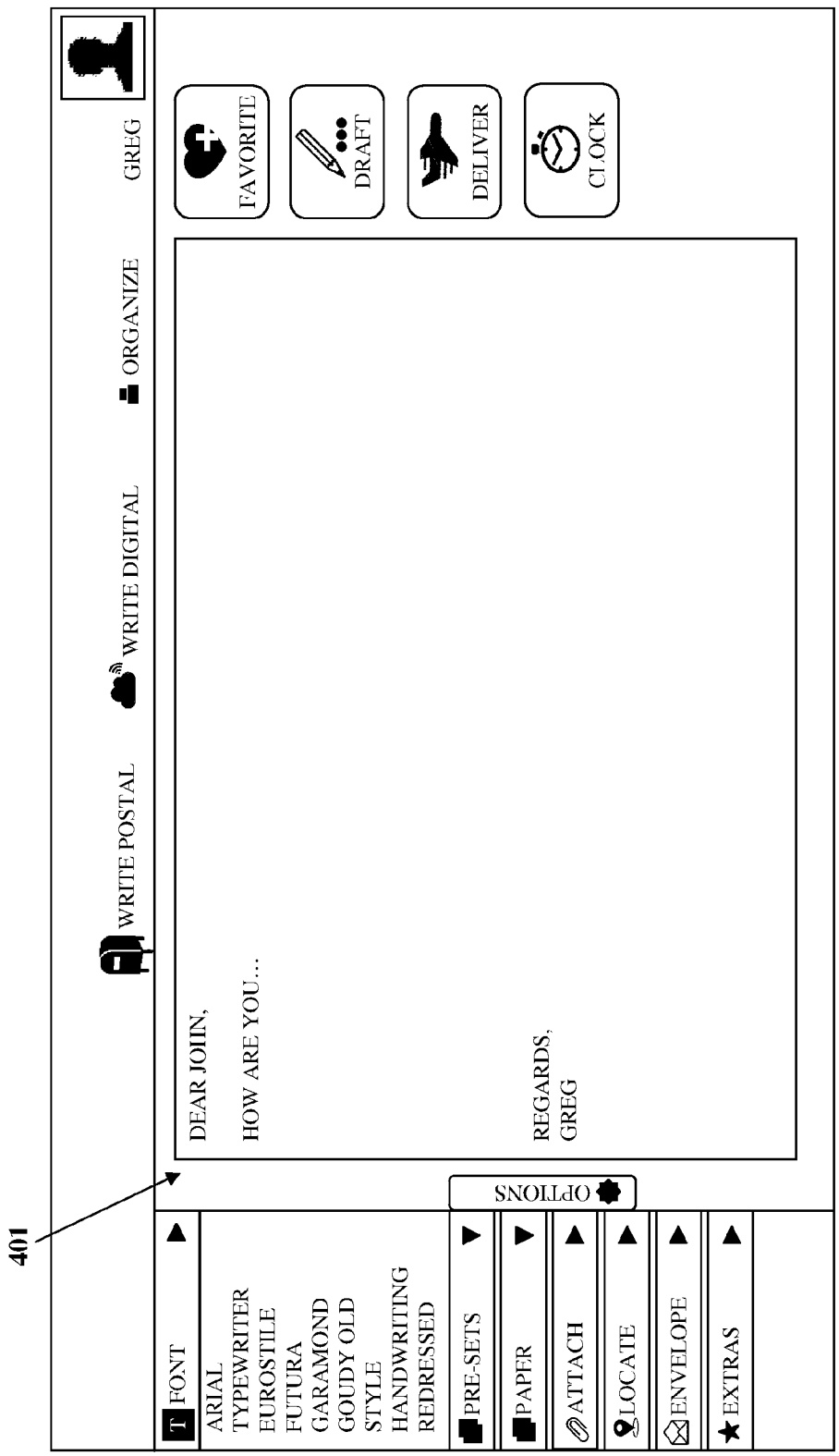
FIGS. 4A-4M exemplarily illustrate screenshots of a graphical user interface provided by the personal communication system for generating and delivering a personalized communication based on a time condition.
Figure 4B:
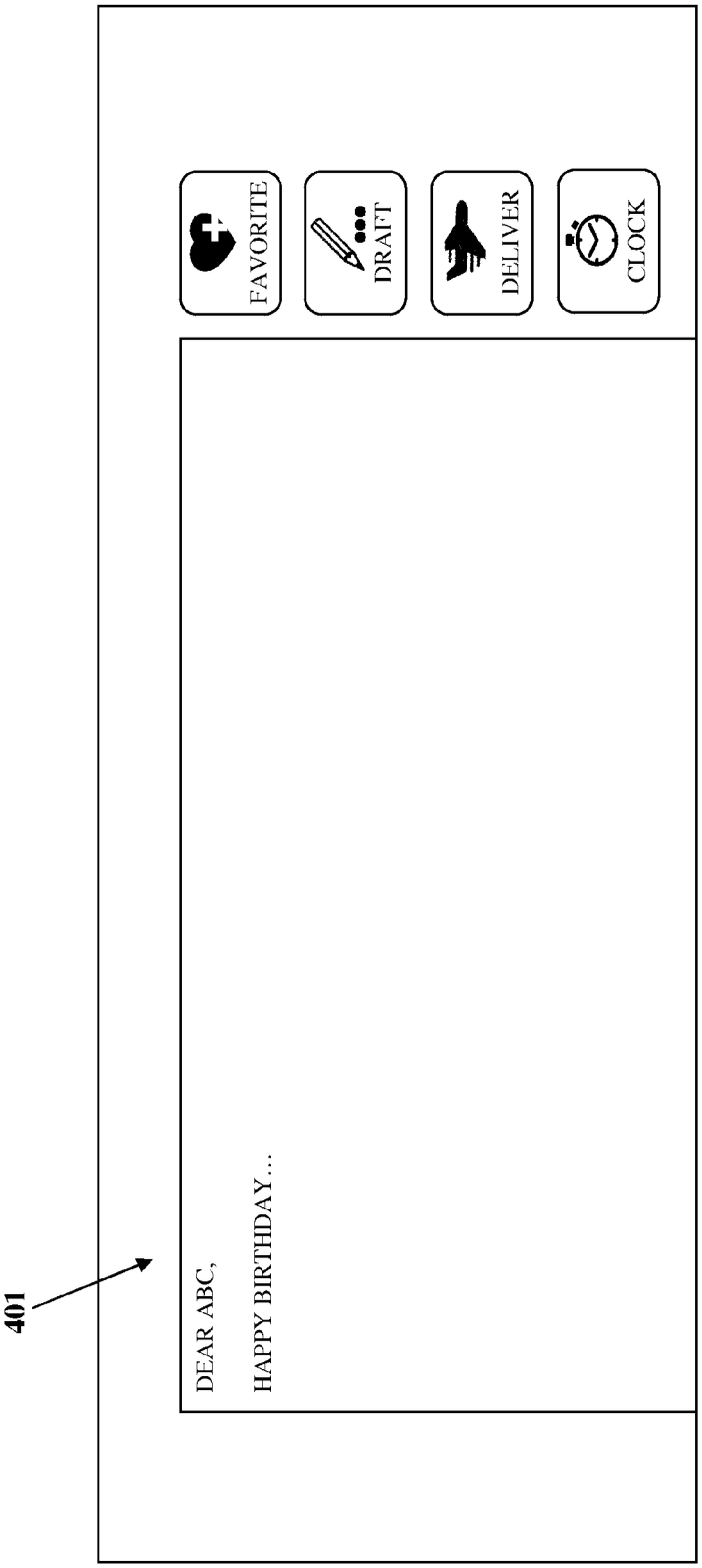
Figure 4C:
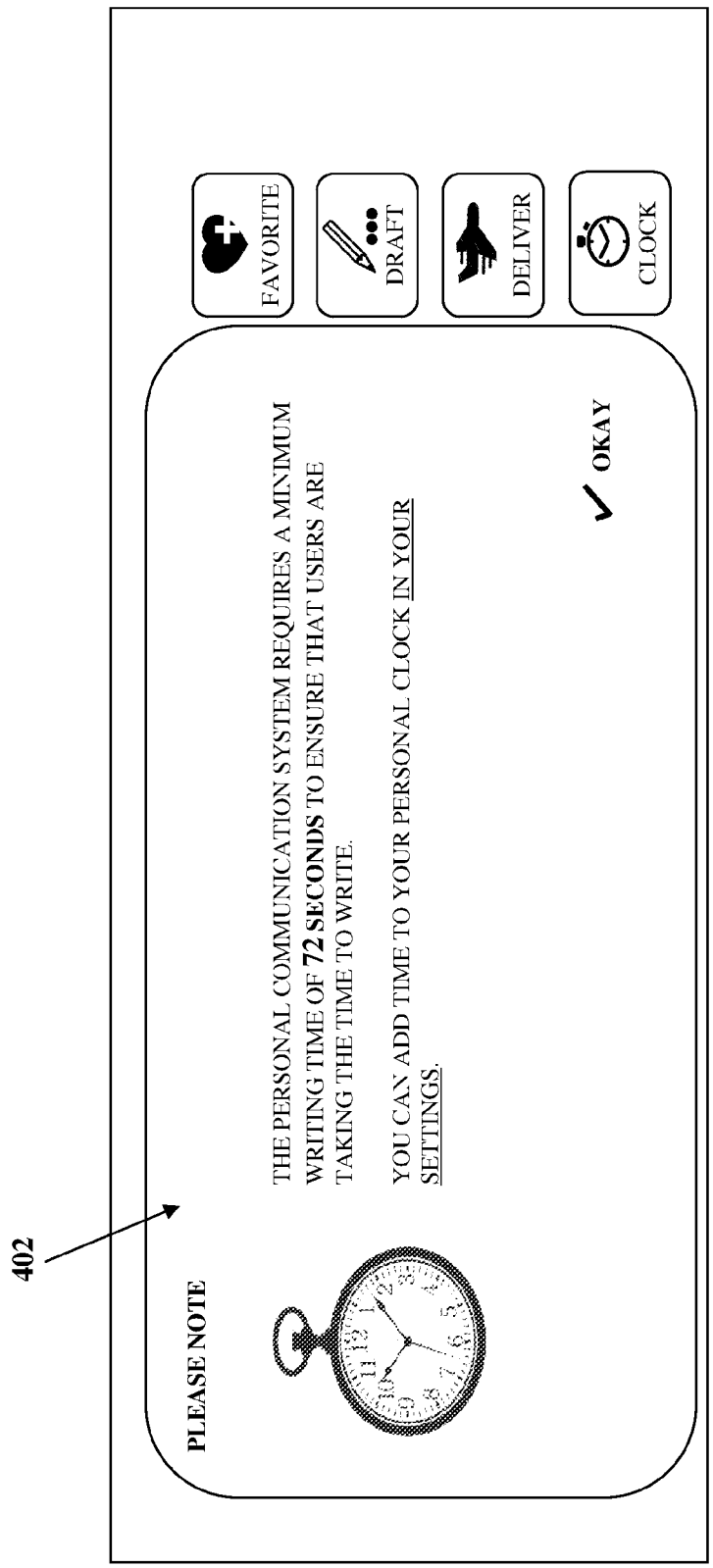

When a sender downloads the personal communication application 204 on the sender device 201 exemplarily illustrated in FIG. 2, and attempts, for example, to write, dictate, type, record, or draw a personalized communication via the write interface section 401 of the GUI 205 of the personal communication system 203, the personal communication system 203 advises the sender that a personalized communication requires a minimum writing time of, for example, at least 1 minute and 12 seconds, that is, 72 seconds, by displaying a pop up notification message 402 as exemplarily illustrated in FIG. 4C. In an embodiment, if the sender wishes to extend the minimum writing time defined in the preliminary time condition displayed on the GUI 205, the pop up notification message 402 provides a clock settings link to the sender to provide sender defined time parameters to change personal clock settings as exemplarily illustrated in FIG. 4C.

Figure 4D:
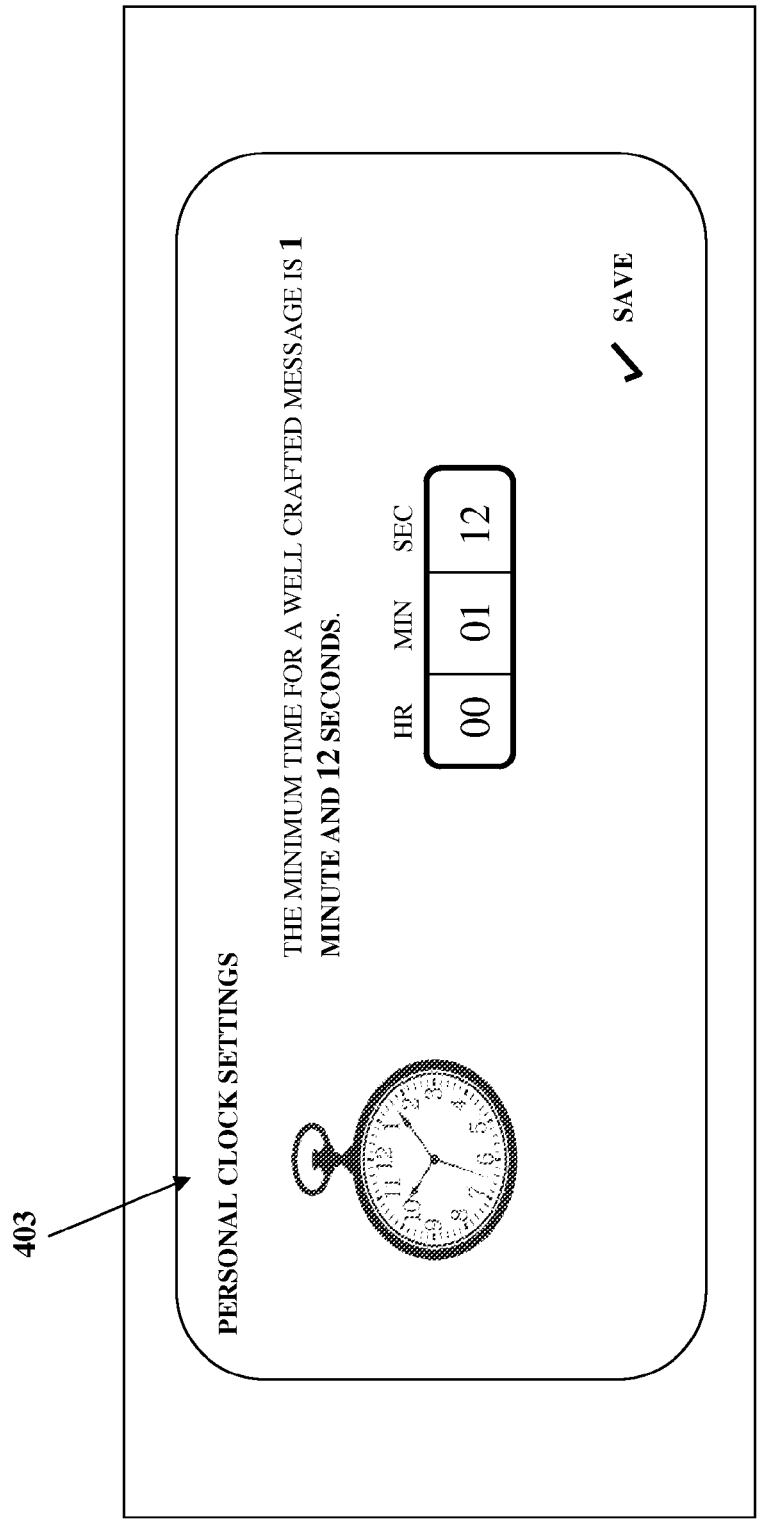
Figure 4E:
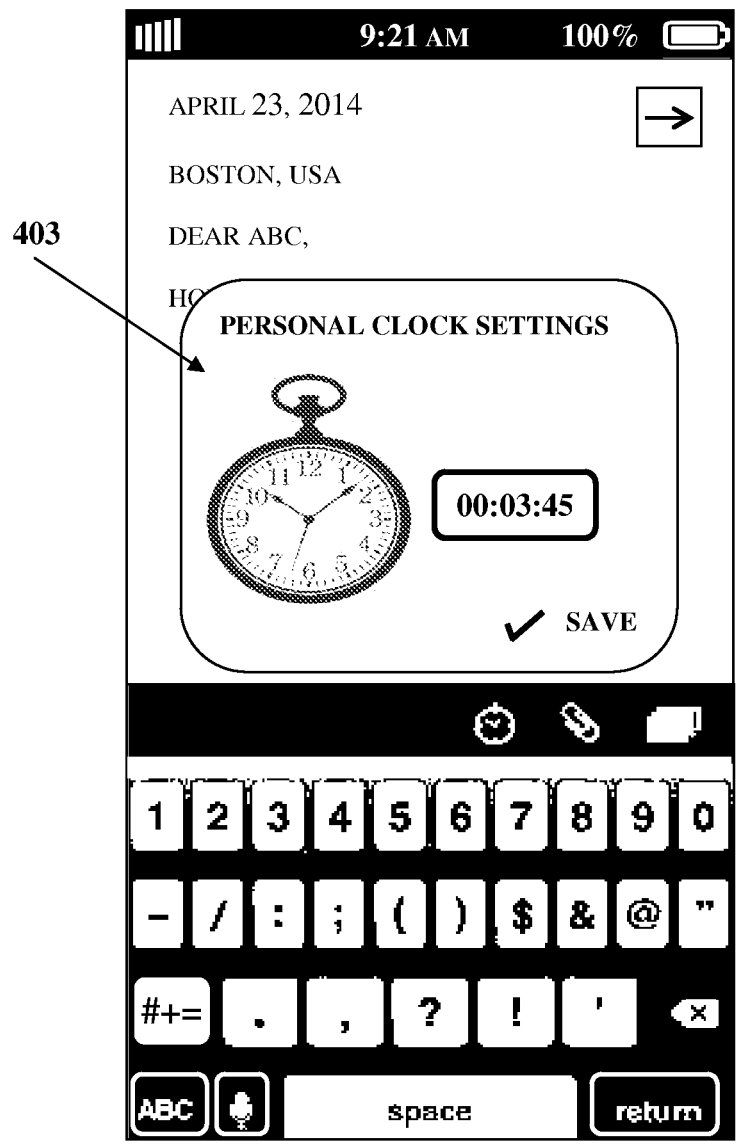

FIGS. 4D-4E exemplarily illustrate screenshots of the GUI 205 provided by the personal communication system 203 exemplarily illustrated in FIG. 2, for changing personal clock settings. Once the sender clicks on the clock settings link provided in the pop up notification message 402 exemplarily illustrated in FIG. 4C, the GUI 205 displays a personal clock settings interface 403 exemplarily illustrated in FIGS. 4D-4E. The personal communication system 203 receives sender defined time parameters to add to the minimum time defined in the configured preliminary time condition from the sender via the GUI 205 as disclosed in the detailed description of FIG. 1. The personal communication system 203 allows the sender to increase the preset minimum time defined in the preliminary time condition configured by the personal communication system 203, for composing the personalized communication via the personal clock settings interface 403 exemplarily illustrated in FIGS. 4D-4E. A sender can create a more personalized time setting for composing a personalized communication by adding more time to the configured preliminary time condition via a clock displayed in the personal clock settings interface 403 exemplarily illustrated in FIGS. 4D-4E. The personal communication system 203 does not allow a sender to define a time parameter of less than the preset minimum time, for example, 1 minute and 12 seconds. FIG. 4E exemplarily illustrates a screenshot of the personal clock settings interface 403 of the GUI 205 displayed on a sender device 201 exemplarily illustrated in FIG. 2, for example, a mobile device, showing the personal clock settings option. As exemplarily illustrated in FIG. 4E, the sender increases the minimum time to 3 minutes and 45 seconds in the personal clock settings interface 403 of the GUI 205.

Figure 4F:
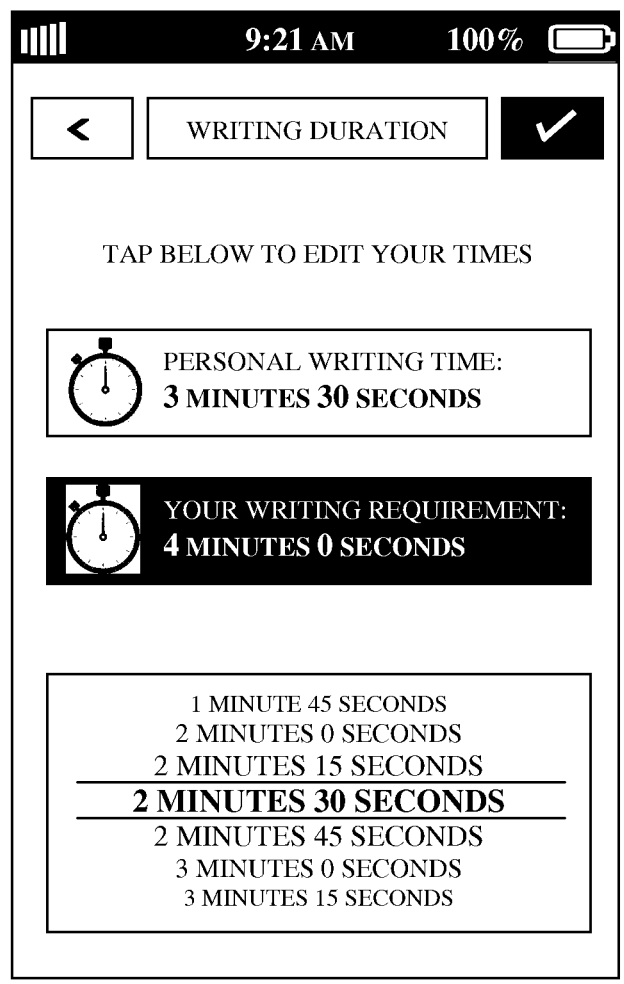
Figure 4G:
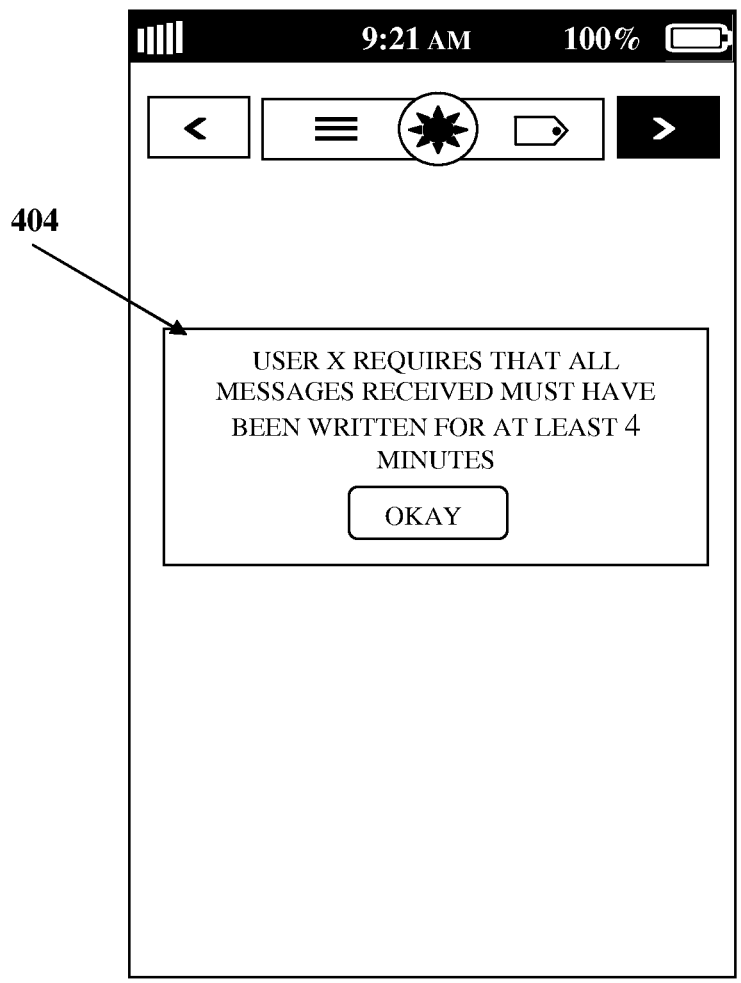
Figure 4H:
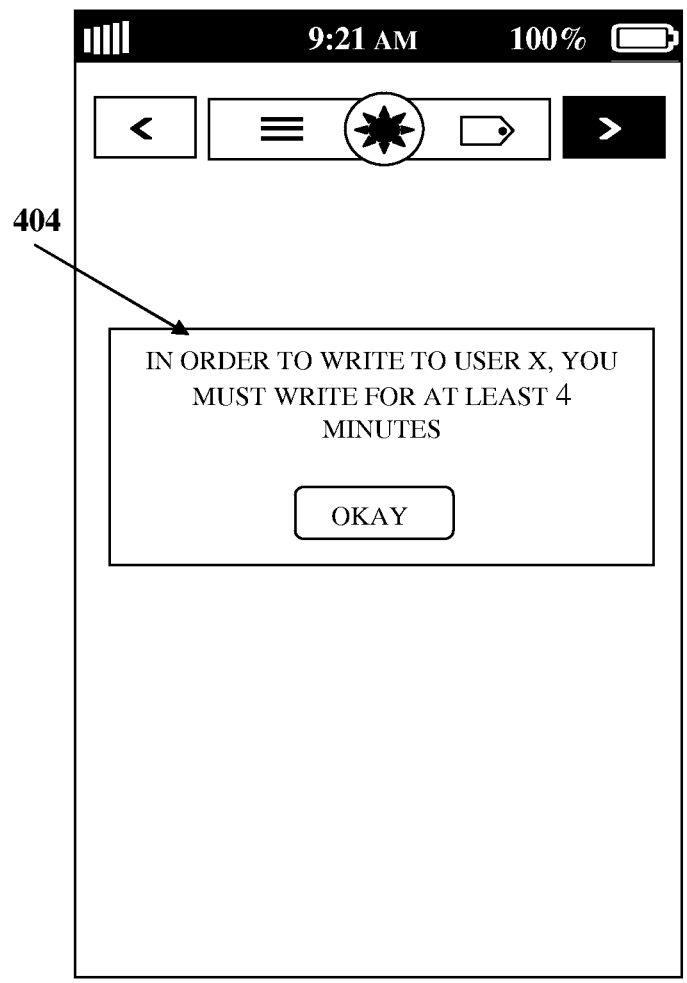

FIGS. 4F-4H exemplarily illustrate screenshots of the GUI 205 provided by the personal communication system 203 exemplarily illustrated in FIG. 2, for generating and displaying a recipient configured time condition to the sender. FIG. 4F exemplarily illustrates a screenshot of the GUI 205 provided by the personal communication system 203 for receiving recipient defined time parameters. A recipient enters time parameters, for example, 4 minutes via the GUI 205 as exemplarily illustrated in FIG. 4F. The personal communication system 203 generates and displays the recipient configured time condition of 4 minutes on the GUI 205 to the sender. The personal communication system 203 generates and displays an advisory alert 404 to notify the recipient configured time condition of 4 minutes to the sender as exemplarily illustrated in FIGS. 4G-4H. In an embodiment, when the sender enters time parameters for generation of the sender configured time condition, the personal communication system 203 displays the advisory alert 404 to the sender via the GUI 205 as exemplarily illustrated in FIGS. 4G-4H. In an embodiment, the sender can configure the time parameters based on the displayed recipient configured time condition.

Figure 4I:
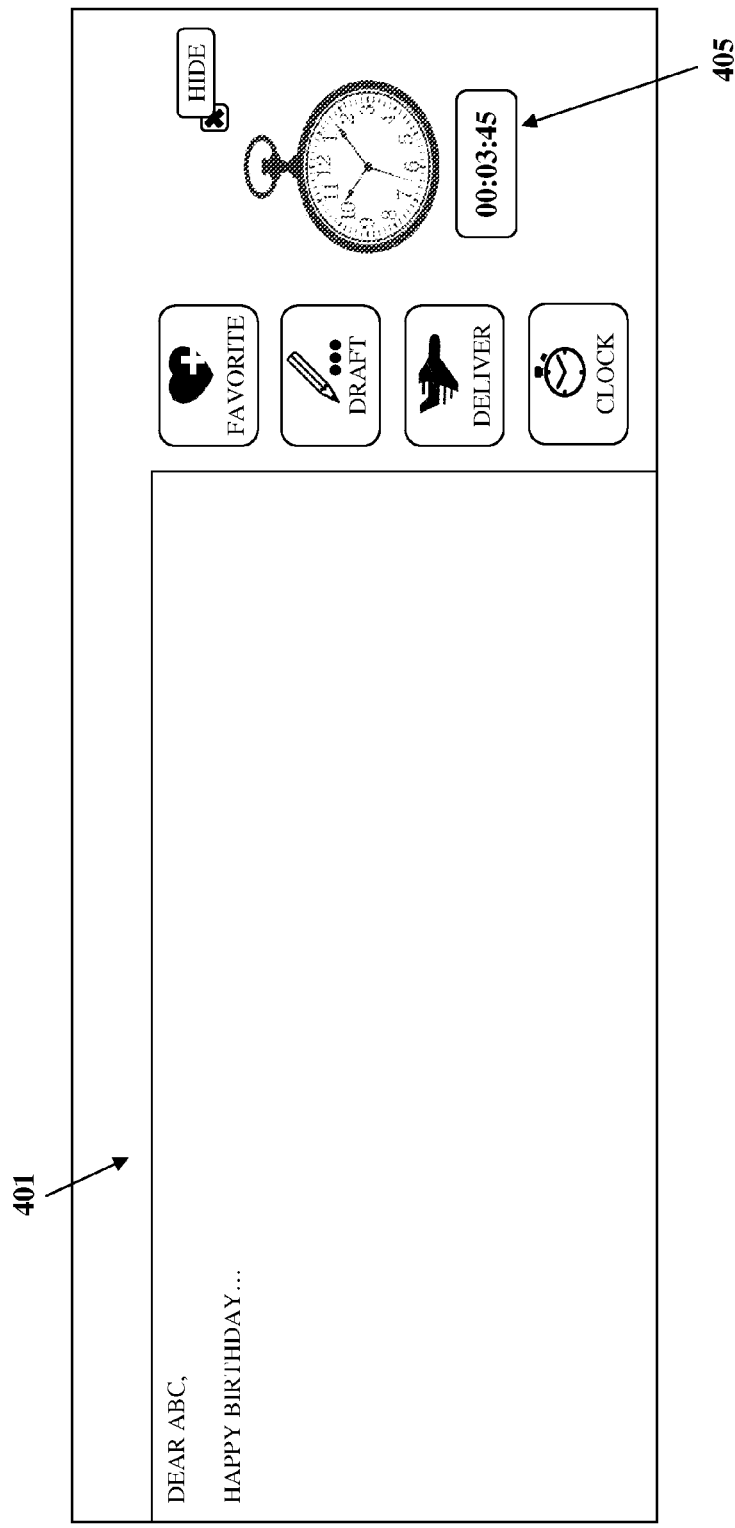

FIG. 4I exemplarily illustrates a screenshot of the write interface section 401 provided on the GUI 205 of the personal communication system 203 exemplarily illustrated in FIG. 2, showing a clock on the write interface section 401 along with a running timer 405. The personal communication system 203 displays the running timer 405 to the sender via the GUI 205 during the composition of the personalized communication. The running timer 405, for example, counts up from zero to the determined optimal time condition or counts down from the determined optimal time condition to zero. The personal communication system 203 also allows the sender to increase the preset minimum time by adding time to the personal clock settings via the clock settings link provided in the pop up notification message 402 exemplarily illustrated in FIG. 4C. When the sender clicks on the "Okay" link on the GUI 205 as exemplarily illustrated in FIGS. 4G-4H, the personal communication system 203 displays a clock on the write interface section 401 along with the running timer 405, for example, that counts up from zero to the preset minimum time as exemplarily illustrated in FIG. 4I.

In an embodiment, the personal communication system 203 also provides an option to the sender to select a clock model from a variety of clock models for display on the write interface section 401. For example, the sender can select to display a mantle clock, a sand clock, or a pendulum clock on the write interface section 401, with numbers underneath the selected clock model that counts up from zero to the preset minimum time or counts down from the preset minimum time to zero.

In an embodiment, the personal communication system 203 provides revenue generation options to third party entities such as watch or clock manufacturing companies. For example, the personal communication system 203 displays clock models sponsored by watch or clock manufacturing companies, for example, Timex Group USA, Inc., Swatch Group Ltd., etc., to generate revenue. The personal communication system 203 provides a "Hide" option on the GUI 205 as exemplarily illustrated in FIG. 4I, to allow the sender to hide the clock model on the GUI 205 while composing a personalized communication, if desired by the sender. Even if the sender hides the clock model on the GUI 205, the personal communication system 203 continues to display the time count for composing the personalized communication on the write interface section 401.

Figure 4J:
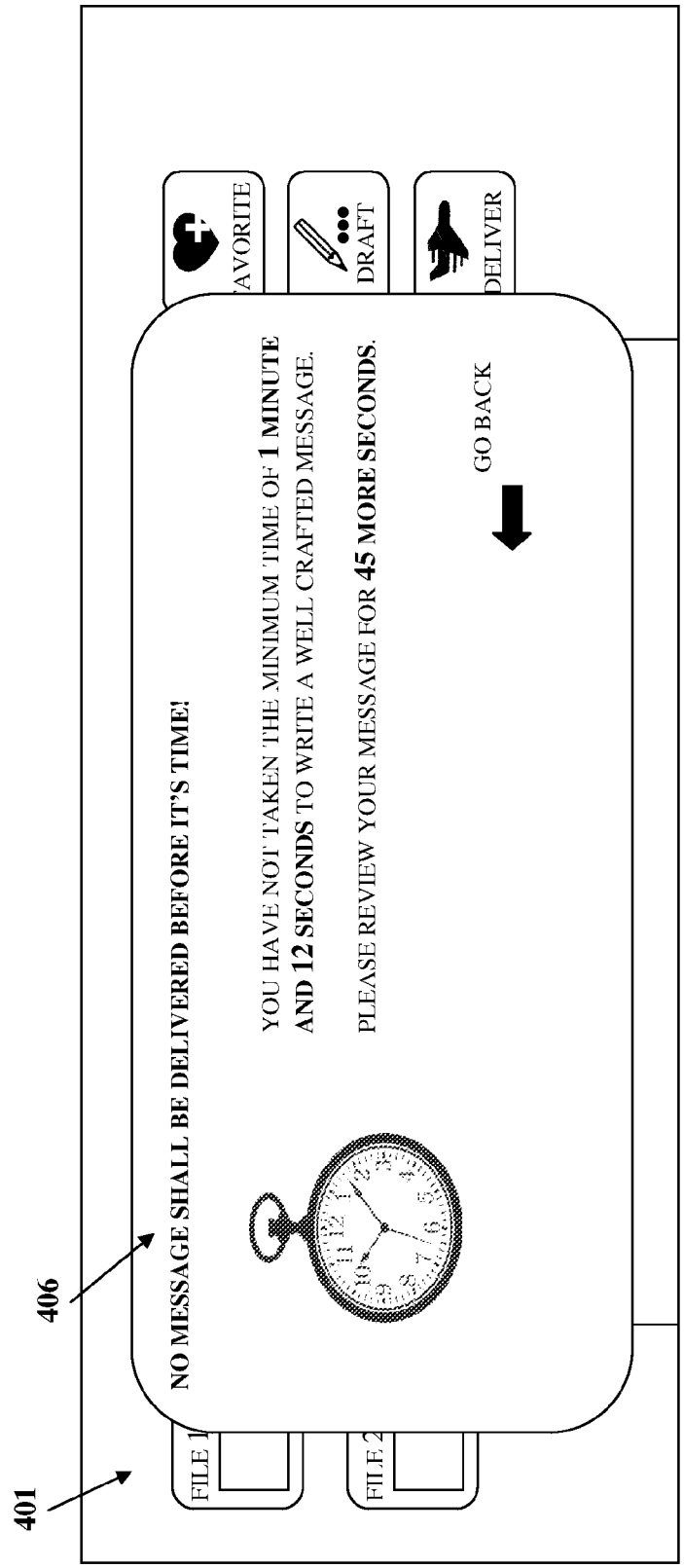
Figure 4K:
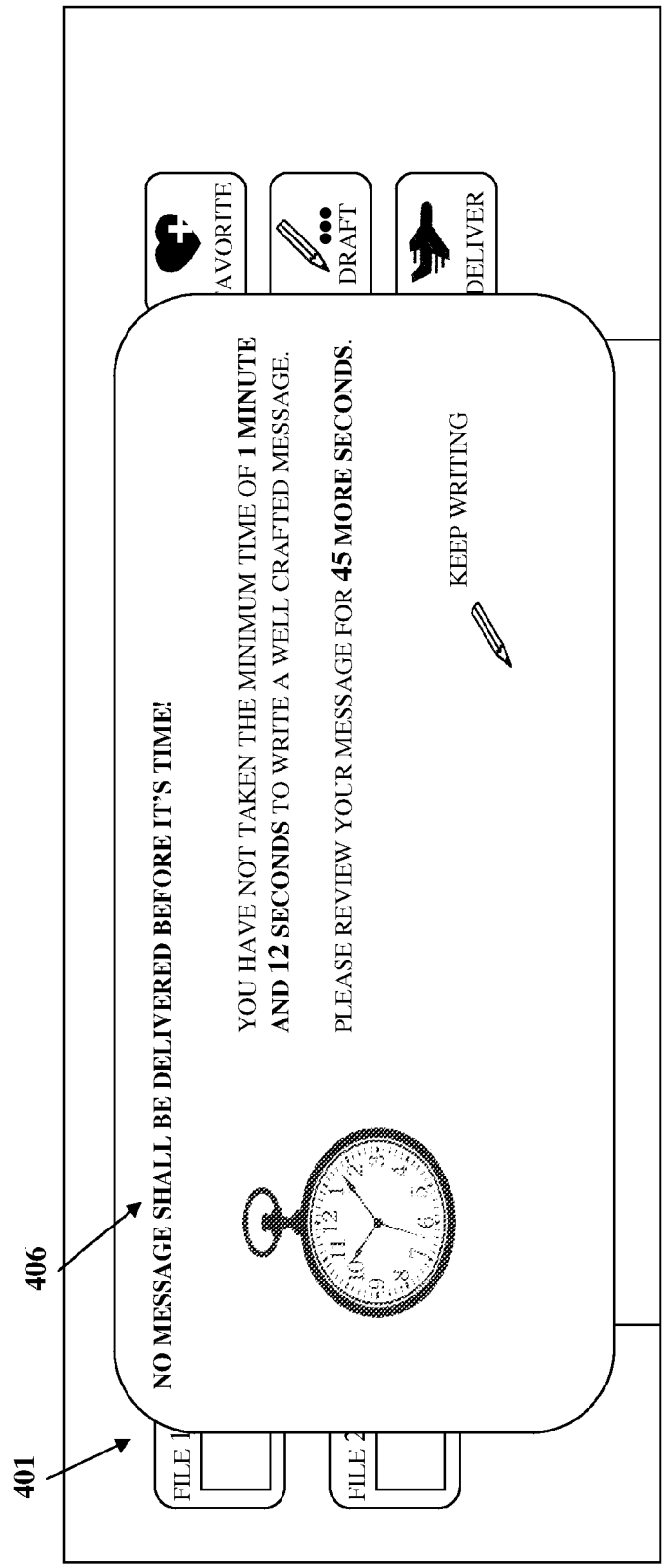

FIGS. 4J-4K exemplarily illustrate screenshots of the GUI 205 provided by the personal communication system 203 exemplarily illustrated in FIG. 2, for notifying a sender to continue composing the personalized communication until the determined optimal time condition is met. The sender must adhere to the optimal time condition, for example, 1 minute and 12 seconds in order to successfully deliver a personalized communication using the personal communication system 203. If the sender does not dedicate the required 1 minute and 12 seconds towards composing a well-crafted personalized communication, the personal communication system 203 displays a pop up notification message 406 indicating that the sender has not devoted the necessary time to consider a permanent and purposeful personalized communication and invites the sender to click on a "go back" button on the GUI 205 as exemplarily illustrated in FIG. 4J, to return to the write interface section 401 to review the personalized communication, or to click on the "keep writing" button on the GUI 205 to continue composing the personalized communication as exemplarily illustrated in FIG. 4K. The personal communication system 203 instructs the sender that the personalized communication cannot be delivered before the optimal time condition is met and displays the time remaining for the sender to review the personalized communication as exemplarily illustrated in FIGS. 4J-4K.

Figure 4L:
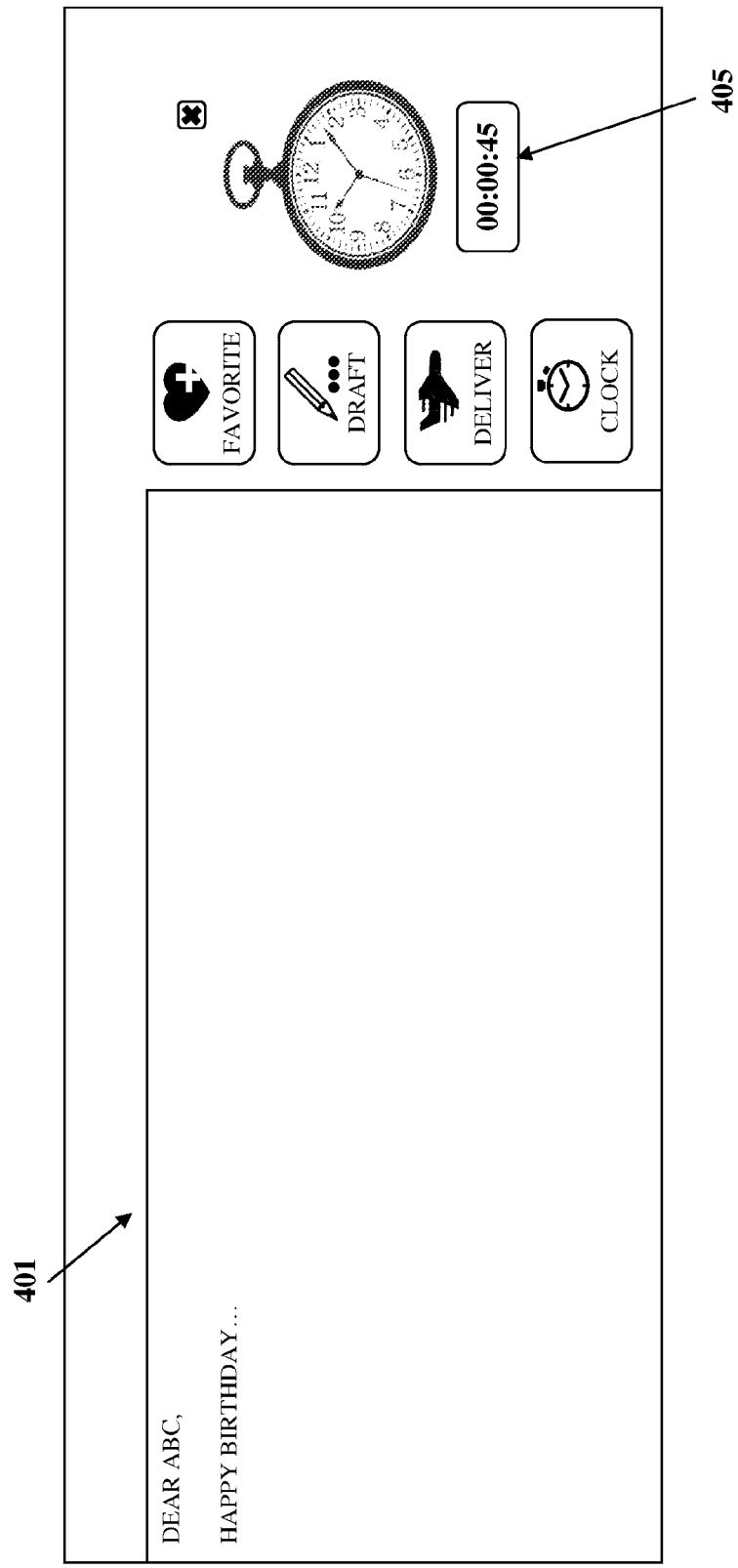

FIG. 4L exemplarily illustrates a screenshot of the write interface section 401 provided on the GUI 205 of the personal communication system 203 exemplarily illustrated in FIG. 2, showing the running timer 405 counting down the remaining time for composing and reviewing the personalized communication. When the sender returns to the write interface section 401, the personal communication system 203 displays the sender selected clock model, showing the time remaining to meet the determined optimal time condition and starts, for example, counting down from the remaining time to zero as exemplarily illustrated in FIG. 4L.

Figure 4M:
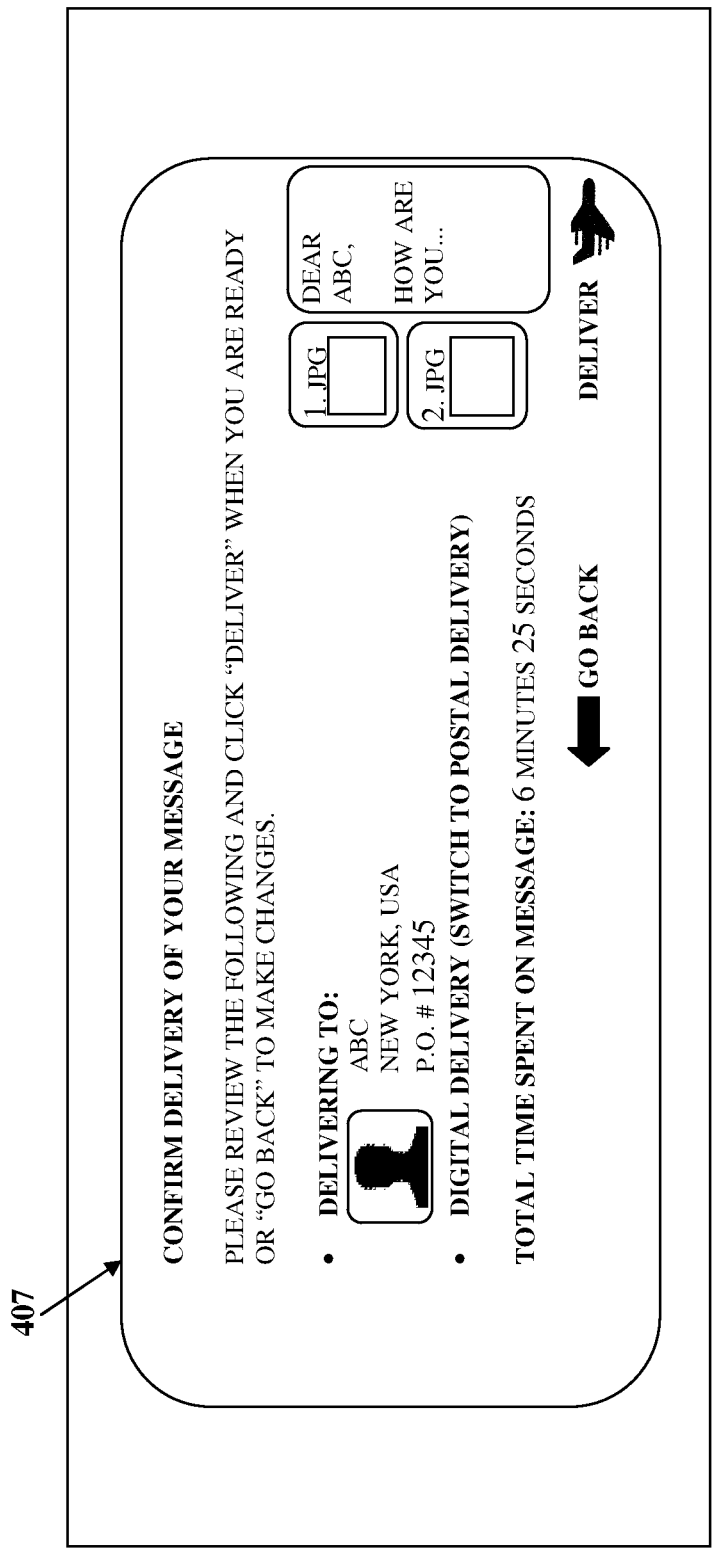

FIG. 4M exemplarily illustrates a screenshot of a delivery interface section 407 provided on the GUI 205 of the personal communication system 203 exemplarily illustrated in FIG. 2. When the sender spends equal to or more than 1 minute and 12 seconds on the personalized communication and submits the personalized communication, the personal communication system 203 delivers the personalized communication and displays a pop up notification message confirming delivery of the personalized communication along with the total time spent on the personalized communication as exemplarily illustrated in FIG. 4M. The personal communication system 203 also allows the sender to return to the write interface section 401 exemplarily illustrated in FIG. 4L, by clicking on a "Go Back" link and to make changes to the composed personalized communication prior to delivering personalized communication to the recipient.

Figure 5:
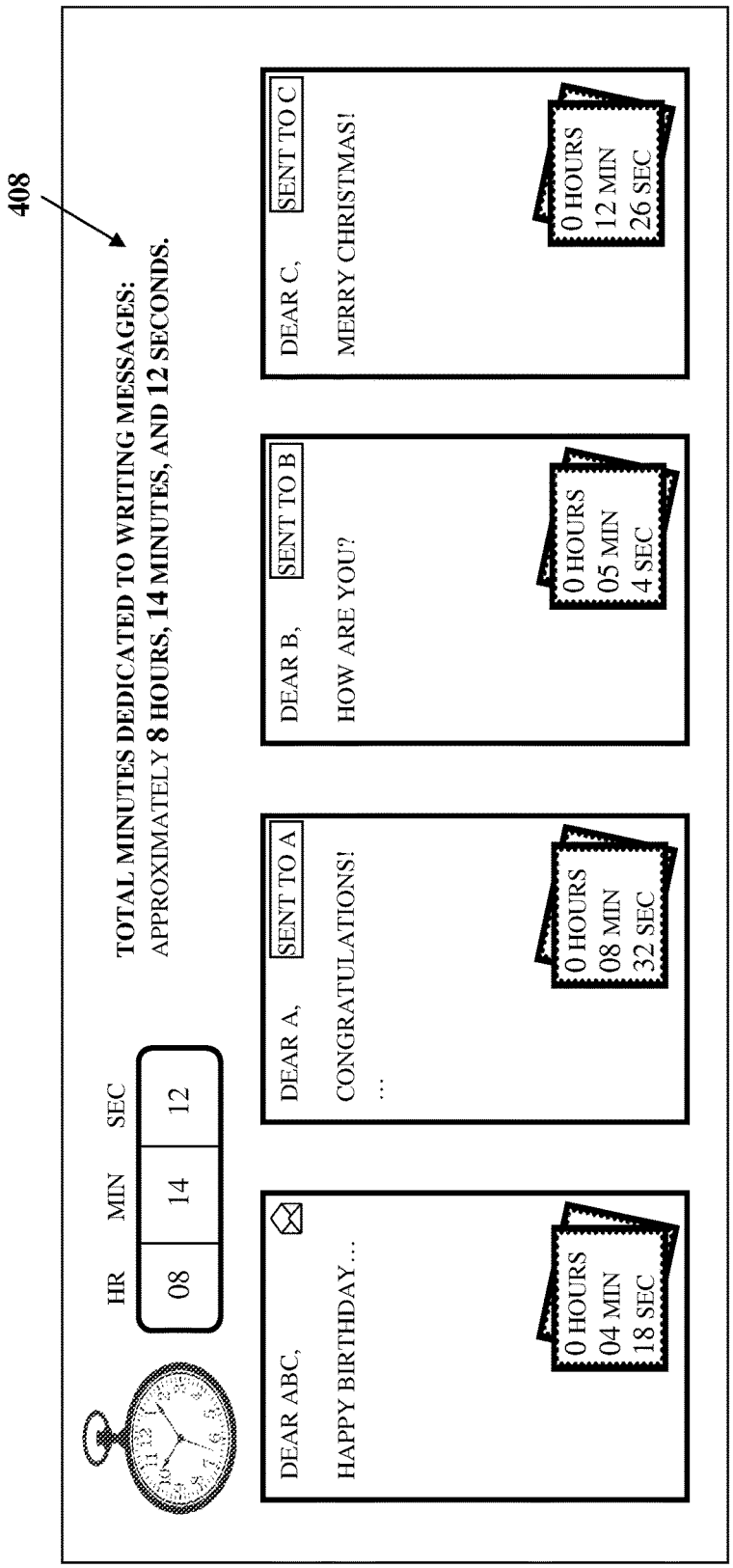
FIG. 5 exemplarily illustrates a screenshot of an archiving interface section on the graphical user interface provided by the personal communication system, showing a time stamp maintained by the personal communication system for each personalized communication composed by a sender.

FIG. 5 exemplarily illustrates a screenshot of an archiving interface section 408 on the graphical user interface (GUI) 205 provided by the personal communication system 203 exemplarily illustrated in FIG. 2, showing a time stamp maintained by the personal communication system 203 for each personalized communication composed by a sender. The archiving interface section 408 is configured, for example, as a desk drawer on the GUI 205 for each sender. The personal communication system 203 displays only those personalized communications that meet the determined optimal time condition that defines the minimum time required for composing each personalized communication, in the archiving interface section 408. The personal communication system 203 maintains time stamps of the generated personalized communications in the archiving interface section 408 to allow the sender to reflect on the time he or she devoted to composing personalized communications over time. In an embodiment, each individual personalized communication displayed in the archiving interface section 408 comprises an individual time stamp as exemplarily illustrated in FIG. 5. The personal communication system 203 also displays a total minutes running summation for the sender on the GUI 205. In an embodiment, the personal communication system 203 provides access to only a sender of the generated personalized communications to view the total minutes running summation and time stamps for all generated personalized communications via the GUI 205. In an embodiment, the personal communication system 203 calculates and displays an aggregate and separate time which refracts the sum of time devoted on all personalized communications by a sender in the archiving interface section 408. The personal communication system 203 displays, for example, a master clock in the archiving interface section 408 on the GUI 205 that displays the total minutes devoted by the sender to composing one or more personalized communications as exemplarily illustrated in FIG. 5.

Disclosed below are examples of Ruby on Rails® implementations of software code snippets to demonstrate various rules and algorithms implemented by the personal communication system 203 exemplarily illustrated in FIG. 2, for generating and delivering a personalized communication based on a time condition to improve the quality and longevity of the personalized communication, where the time condition is the rule that triggers the publishing or delivery of the personalized communication.

Disclosed below is a Ruby on Rails® implementation of a code snippet from a computer program code executed by the personal communication system 203 exemplarily illustrated in FIG. 2, for displaying a clock on the graphical user interface (GUI) 205 of the personal communication system 203 while a sender composes a personalized communication, and for allowing the sender to configure personal clock settings on the GUI 205 exemplarily illustrated in FIG. 2:

```
//MODEL-
class WritingDeskClock
    include Mongoid::Document
    include Mongoid::Timestamps
    include ActsAsList::Mongoid
    field :name, type: String
    field :enabled, type: Boolean, default: true
    field :is_default, type: Boolean, default: false
    mount_uploader :image, WritingDeskClockUploader # Black Matte
    mount_uploader :alt_image, WritingDeskClockUploader # White Matte
    scope :enabled, where(enabled: true)
    scope :order_by_position, order_by(position: 'ASC')
    validate :default_should_be_enabled
    has_many :users, dependent: :nullify
    after_create :init_position
    def init_position
        init_list_item!
        move(:top)
    end
    def make_default!
        if self.update_attributes(is_default: true)
            self.class.excludes(id: self.id).each { |t|
            t.update_attributes is_default: false }
            self
        else
            false
        end
    end
    def self.default_clock
        self.where(is_default: true).first ||
        self.enabled.order_by_position.first
    end
    def default_should_be_enabled
        if is_default && !enabled
```

```
        errors.add(:base, 'default should be enabled')
      end
    end
end
```

Disclosed below is a Ruby on Rails® implementation of a code snippet from a illustrated in FIG. 2, for timing the composition of a personalized communication by a sender via the GUI 205 of the personal communication system 203 exemplarily illustrated in FIG. 2:

```
class WritingTimeLog < TimeLog
    belongs_to :letter, index: true
    after_create :increment_letter_writing_time
    def increment_letter_writing_time
        self.letter.inc(:writing_time, duration)
    end
end
```

Disclosed below is a Ruby on Rails® implementation of a code snippet from a computer program code executed by the personal communication system 203 exemplarily illustrated in FIG. 2, for maintaining and validating a time stamp for a timed personalized communication composed by a sender:

```
class TimeLog
    include Mongoid::Document
    include Mongoid::Timestamps
    field :start_at, type: DateTime
    field :end_at, type: DateTime
    validates :start_at, presence: true
    validates :end_at, presence: true
    validate :end_at_should_larger_than_start_at
    def end_at_should_larger_than_start_at
        if start_at.present? && end_at.present? && duration <= 0
            errors.add(:base, 'end_at should larger than start_at')
        end
    end
    # translate to seconds
    def duration
        t = (end_at – start_at) * 1.day
        t.to_i
    end
end
```

Disclosed below is a Ruby on Rails® implementation of a code snippet from a computer program code executed by the personal communication system 203 exemplarily illustrated in FIG. 2, for initiating generation and delivery of a personalized communication:

```
class Letter
    include Mongoid::Document
    include Mongoid::Timestamps
    include Mongoid::MagicCounterCache
    include Mongoid::Document::Taggable
    include HumanSetter
    include TagRefactor
    include Sunspot::Mongoid2
    define_callbacks :mark_as_read
    include Concerns::Letter::Callbacks
    include Concerns::Letter::Comments
    include Concerns::Letter::Delivery
    include Concerns::Letter::WritingTimer
    include Concerns::Letter::ReadingTimer
    include Concerns::Likeable
    include GoogleTranslate
    include Rails.application.routes.url_helpers
    paginates_per 30
    #
    # CONSTANTS
    #
    # recipient_location = 0:counter, 1:fridge, 2:shoebox
    RECIPIENT_LOCATION = [:counter, :fridge, :shoebox]
    SEND_TO_TYPES = %w{email facebook twitter linkedin google address uid open}
    SORT_TYPES = { "most popular" => "read_count-desc",
                   "newest" => "sent_at-desc",
                   "oldest" => "sent_at-asc" }
    DRAFT_TYPES = %w{digital_open digital_private physical}
    INTERNATIONAL_FEE = 1
    human_accessible :recipient_location => RECIPIENT_LOCATION
    #
    # FIELDS
    #
    field :content
    field :recipient_location, type: Integer, default: 0
    field :recipient_deleted, type: Boolean, default: false
    field :author_deleted, type: Boolean, default: false
    field :allow_public, type: Boolean, default: false
    field :is_digital, type: Boolean
    field :draft_type, type: String # 'digital_open', 'digital_private', 'physical'
    # send_to_type: see SEND_TO_TYPES
    field :send_to_type, type: String
    field :send_to, type: String
    # Message for getting the postal address via email in postal delivery without email
    field :message_for_recipient, type: String
    field :date, type: Date
    field :short_id, type: String
    field :distance, type: Hash, default: { } # distance between from_location to to_location
    field :view_count, type: Integer, default: 0
    field :is_read, type: Boolean, default: false
    field :retrieval_code, type: String
    field :recipient_notified_at, type: DateTime, default: nil
    field :hidden, type: Boolean, default: false
    field :future_mailing_date, type: DateTime
    field :mailed_at, type: DateTime
    field :delivery_state, type: String
    field :original_language, type: String
    field :sent_at, type: DateTime, default: nil
    mount_uploader :preview_image, PreviewImageUploader
    embeds_one :coord, class_name: 'Coordinate'
    alias_method :read_count, :view_count
    #
    # INDEXING
    #
    # after changing model index, need run: rake db:mongoid:create_indexes
    index({short_id: 1}, {unique: true})
    index({created_at: -1})
    index({delivery_state: 1})
    index({retrieval_code: 1})
    #
    # ASSOCIATIONS
    #
    belongs_to :author, class_name: "User", foreign_key: 'author_id',
               inverse_of: :sent_letters, index: true
    counter_cache :author, :field => "sent_letters_count"
    belongs_to :recipient, class_name: "User", foreign_key: 'recipient_id',
               inverse_of: :received_letters, index: true
    belongs_to :whitelist, index: true
    has_one :letter_transaction, dependent: :nullify
    has_one :letter_address, autosave: true
    has_many :letter_tags, autosave: true, dependent: :destroy do
        # Create the associate Tag if necessary
        def new_with_tag(*args)
            ret = new(*args)
            if ret.name and ret.tag.blank?
```

```
            tag = Tag.where(name: ret.name).first
            tag = Tag.new(name: ret.name) unless tag
            ret.tag = tag
        end
        ret
    end
    def create_with_tag(*args)
        ret = new_with_tag(*args)
        ret.tag.save unless ret.tag.persisted?
        ret.save
        ret
    end
end
has_many :theme_usage_logs, dependent: :destroy
has_many :view_logs, as: :loggable, autosave: true, dependent:
:delete
has_many :letter_attachs, class_name: "LetterAttach", autosave:
true, dependent:
        :destroy
alias_method :attachments, :letter_attachs
alias_method :attachments=, :letter_attachs=
belongs_to :package, index: true
embeds_one :custom_theme
embeds_one :from_location, class_name: "Location", inverse_of:
:from_letter
embeds_one :to_location, class_name: "Location", inverse_of:
:to_letter
```

Disclosed below is a Ruby on Rails® implementation of a code snippet from a computer program code executed by the personal communication system 203 exemplarily illustrated in FIG. 2, for performing validations in the generation and delivery of a personalized communication:

```

# VALIDATIONS

validates :author_id, presence: true
validates :package_id, inclusion: Package.all.map(&:id), allow_nil: true
validates :send_to_type, inclusion: SEND_TO_TYPES, allow_nil: true
validates :draft_type, inclusion: DRAFT_TYPES, allow_nil: true
# validates :send_to, presence: true, email_format: true,
#            if: "['email', 'google'].include?(send_to_type) ||
(send_to_type_changed? &&
        send_to_type == 'mailing_address_email')"
validate :need_mailing_address, if: "send_to_type == 'address'"
```

Disclosed below is a Ruby on Rails® implementation of a code snippet from a computer program code executed by the personal communication system 203 exemplarily illustrated in FIG. 2, for defining scopes and tags for generation and delivery of a personalized communication:

```

# SCOPES

scope :default_order, desc(:sent_at)
scope :recipient_received, where(:delivery_state.in =>
%w(digital_delivered
            postal_digitally_retrieved))
scope :delivery_state, -> delivery_state { where(:delivery_state =>
delivery_state) }
# author locations (public/private not applicable)
scope :drafts, where(delivery_state: 'draft', author_deleted: false)
scope :drawer, where(author_deleted: false).nin(delivery_state:
%w(new draft
            digital_waiting_future_send))
# private letters
scope :counter, where(recipient_location: 0, recipient_deleted:
false).recipient_received
scope :shoebox, where(recipient_location: 2, recipient_deleted:
false).recipient_received
# public letters
scope :fridge, where(recipient_location: 1, recipient_deleted:
false).recipient_received
scope :missing_address, where (delivery_state:
'postal_waiting_address')
scope :digital, where(is_digital: true)
scope :physical, where(is_digital: false)
scope :not_deleted_by_author, where(author_deleted: false)
scope :not_deleted_by_recipient, where(recipient_deleted: false)
scope :with_coords, excludes(coord: { }).where(:coord.ne => nil)
scope :per_page, ->(pn) { page(pn) }
scope :sent_during, ->(_start, _end) { where(:sent_at.gt => _start,
:sent_at.lt => _end) }
scope :sent_before, ->(_date) { where(:sent_at.lt => _date) }
scope :sent_after, ->(_date) { where(:sent_at.gt => _date) }
# unread: for digital regular delivered letter
scope :unread, where(is_read: false, delivery_state: 'digital_delivered',
is_digital: true,
        _type: 'Letter')
scope :regular, where(_type: 'Letter')
scope :type, ->(type) { where(_type: type) }
scope :sort_by_view_count, order_by(view_count: :desc)
scope :default_includes, includes(:letter_tags, :letter_attachs)
scope :default_scope, where(:hidden.in => [nil, false])
scope :of_day, ->(day) { where(:created_at.gt =>
day.beginning_of_day,
                :created_at.lt => day.end_of_day) }
scope :with_short_id_or_id_of, ->(query) { scoped.or({ short_id:
query }, { '_id' =>
query }).limit(1) }
# NOTICE: overwrite save method for state machine
#           letter can not save 'new' delivery state,
#           and also it should be 'draft'
def save(options = { })
    self.delivery_state = :draft if new?
    super
end
def letter_tag_names
    letter_tags.map(&:name)
end
alias_method :tags, :letter_tag_names

# Accepts an array of strings.

def tags=(new_tags)
    new_tags = new_tags.map { |tag| tag.to_s.strip }
    current_tags = tags
    letter_tags.in(name: (current_tags - new_tags)).destroy
    (new_tags - current_tags).each do |tag|
        letter_tags.create_with_tag(name: tag)
    end
end

# Sunspot / Solr Search

searchable do
    text :content
    text :letter_tags do
        letter_tags.map { |t| t.name }
    end
    text :author, boost: 5 do
        author.present? ? author.name : ""
    end
    string :letter_tag_names, multiple => true
    string :author_id
    boolean :author_deleted
    string :recipient_id
    boolean :recipient_deleted
    integer :recipient_location
    string :delivery_state
    string :_type do
        self[:_type]
    end
    integer :read_count
    time :created_at
    time :sent_at
end
```

Disclosed below is a Ruby on Rails® implementation of a code snippet from a computer program code executed by the personal communication system 203 exemplarily illustrated in FIG. 2, for defining instance methods for creation of themes for composition of a personalized communication and delivery of the personalized communication:

```

# INSTANCE METHODS

# alias_method :theme, :custom_theme
# theme must respond to
#        as_style(:version)
#        font_as_style(:version)
#        ink_color_as_style(:version)
#        paper_as_style(:version)
def theme
    self.custom_theme || OfficialTheme.default_theme
end
def digital?
    !!is_digital
end
def physical?
    !is_digital.nil? && !is_digital
end
# define x, y, z getters/setters
['x', 'y', 'z']. each do |col|
    define_method "#{col}" do
        self.build_coord if self.coord.blank?
        self.coord.send("#{col}")
    end
    define_method "#{col}=" do |value|
        self.build_coord if self.coord.blank?
        self.coord.send("#{col}=", value)
    end
end
# This method cannot be overriden in delivery.rb
def digital_deliver(*args)
    match_recipient!
    super(*args)
end
```

Disclosed below is a Ruby on Rails® implementation of a code snippet from a computer program code executed by the personal communication system 203 exemplarily illustrated in FIG. 2, for defining scopes for creating recipient locations for delivery of a personalized communication:

```
# recipient location
#        0 - counter
#        1 - fridge
#        2 - shoebox

RECIPIENT_LOCATION.each_with_index do |status, i|
    define_method "on_#{status}?" do
        recipient_location == i
    end
end
def set_recipient_location
    # NOTICE: here need use self
    self.human_recipient_location = open_letter? ? :fridge : :counter
end
def recipient_notified!
    set('recipient_notified_at', Time.now) unless recipient_notified_at?
end
def make_public_or_send_request!
    allow_public ? move_to_fridge! : request_public
end
def request_public
    LetterMailer.public_permission_request(self.id).deliver
end
def move_to_fridge!
    update_attributes recipient_location: 1
    letter_tags.update_all(letter_type: "public")
end
def back_to_counter!
    update_attributes recipient_location: 0
end
def grant_public!
    update_attributes recipient_location: 1, allow_public: true
    LetterMailer.public_permission_request_granted(self.id).deliver
end
def make_private!
    h = {recipient_location: 2}
    # When the letter has the same recipient and author, remove it from desk drawer
    h.merge!({author_deleted: true }) if recipient_id == author_id
    update_attributes (h)
    letter_tags.update_all(letter_type: nil)
    self.coord.try(:destroy)
end
def make_open!
    set(:_type, 'OpenLetter')
    self.attributes = {
        allow_public: true,
        read_count: 1,
        recipient_id: author_id,
        send_to: nil,
        send_to_type: nil
    }
    digital_deliver
    author.update_attribute(:open_letters_count,
    author.open_letters_count + 1)
end
def public?
    on_fridge? and allow_public?
end
def sent_to_self?
    author_id == recipient_id
end
def related_to? User
    return false if user.blank?
    return true if user.author?(self) or user.recipient?(self)
    false
end
# author, recipient and commenters
def related_users(opts = { })
    _users = [ ]
    _users << author_id
    _users << recipient_id
    _users << comments.map(&:author_id)
    _users.flatten!
    _users.compact!
    _users.uniq!
    _users.delete(opts[:exclude]) if opts [:exclude].present?
    User.where(:_id.in => _users)
end
def increment_read_count!
    inc :read_count, 1
end
```

Disclosed below is a Ruby on Rails® implementation of a code snippet from a computer program code executed by the personal communication system 203 exemplarily illustrated in FIG. 2, for generation of a personalized communication by including media content received from a sender via the GUI 205 of the personal communication system 203 exemplarily illustrated in FIG. 2:

```
def has_attach?
    # NOTICE: query optimization
    #        1. letter.letter_attach will always query from the db
    #        2. Mongoid need write the query cache manually,
    #        3. use letter_attach_ids do not need to query from the db
    letter_attach_ids.present?
end
def has_content?
    self.content.present?
end
def social_shared_image(opts={ })
    # ActionController::Base.helpers.image_path('13_1200x630.jpg')
    if preview_image.present?
        if opts && opts[:preview_image_version]
```

```
            preview_image.url(opts[:preview_image_version])
        else
            preview_image.url
        end
    elsif has_attach?
        letter_attachs.first.image_url(:thumb)
    else
        ActionController::Base.helpers.image_path('logo_chop.png')
    end
end
```

Disclosed below is a Ruby on Rails® implementation of a code snippet from a computer program code executed by the personal communication system 203 exemplarily illustrated in FIG. 2, for calculating cost of delivering a generated personalized communication:

```
def total_price
    _price = 0
    _price += package.price if package
    _price += letter_address.postage if letter_address
    _price
end
```

Disclosed below is a Ruby on Rails® implementation of a code snippet from a computer program code executed by the personal communication system 203 exemplarily illustrated in FIG. 2, for delivering the personalized communication:

```
def type
    open_letter? ? :open : :regular
end
def regular?
    !open_letter?
end
def open_letter?
    is_a?(OpenLetter) || (_type=='OpenLetter')
end
def is_unread?
    !is_read && digital_delivered? && self.author !=self.recipient
end
%w{facebook twitter}.each do |social_network|
    define_method "#{social_network}_auth" do
        authentications.where(provider: social_network).first
    end
end
%w{from_location to_location}.each do |_location|
    define_method "#{_location}_name" do
        return "" if self.send(_location).blank?
        return self.send(_location).short_name
    end
    define_method "has_#{_location}?" do
        return true if self.send(_location).present? &&
            self.send(_location).lat.present? &&
            self.send(_location).lng.present?
        return false
    end
end
def generate_retrieval_code
    return if retrieval_code.present? || recipient_id.present?
    begin
        s=SecureRandom.hex(6)
    end while Letter.where(retrieval_code: s).exists?
    self.retrieval_code=s
end
def generate_retrieval_code!
    generate_retrieval_code
    save!(:validate=>false)
end
def generate_short_id
    self.short_id         ||=generate_alphanumeric_with_
        unique_field(:short_id)
    return if short_id.present?
    begin
        s=generate_alphanumeric
    end while Letter.where(short_id: s).exists?
    self.short_id=s
end
def generate_alphanumeric(_length=6)
    o=[('0' .. '9'),('a' .. 'z')].map{|i| i.to_a}.flatten
    (0..._length).map{o[rand(o.length)] }.join
end
def     generate_alphanumeric_with_unique_field(field,
    length=6)
    begin
        ret=generate_alphanumeric
    end while self.class.where(field=>ret).exists?
    ret
end
def success_message
    open_letter? ? "Your open letter has been sent to
        fridge." : "You will be notified when your letter has
        been delivered."
end
def void?
    self.letter_transaction.void? if self.letter_transaction.present?
end
def mark_as_read!
    run_callbacks :mark_as_read do
        update_attribute(:is_read, true) unless is_read
    end
end
# signature_available?
def signature_available_for_user?(user)
    letter_signature.image.present?
end
def translate_to!(_target)
    tran=translations.where(language: _target).first
    return tran.content if tran.present?
    opts={
        target: _target,
        q: content
    }
    opts[:source]=original_language if original_language.present?
    _ret=GoogleTranslate.to(opts)
    if _ret[:result]
        tran=self.translations.build(language: _target, content:
            _ret[:translated_text])
        if original_language.blank? && _ret[:lan].present?
            self.set(:original_language, _ret[:lan]) # set letter's
                original language
        end
        tran.save
        return tran.content
    else
        # Error
        logger.info 'Letter translate Error'+'**'* 10
        logger.info _ret[:message]
        return nil
    end
```

```ruby
end
def generate_preview_image!
  letter=self
  js_url=File.join(Rails.root.to_s, 'lib', 'assets',
      'javascripts', 'capture.js')
  # NOTICE: in order to not be blocked by the http request,
      here we use the haml string
  html=ApplicationController.new.tap do |controller|
    controller.instance_variable_set(:@letter, self)
    controller.instance_variable_set(:@host, APP_CON-
        FIG['host'] || 'http://lettrs.com')
  end.render_to_string(:template=>'letters/
      preview', :layout=>nil)
  htmlfile=Tempfile.new(['letter_', '.html'])
  htmlfile.write(html)
  htmlfile.close
  begin
    pngfile=Tempfile.new(['letter_', '.jpg'])
    _cmd="phantomjs2 #{js_url} #{htmlfile.path} #{png-
        file.path}"
    if system _cmd
      self.preview_image=pngfile
      self.save!
    end
  rescue=>e
    logger.info 'Error generate_preview_image ...'
    logger.info e
  ensure
    pngfile.unlink # deletes the temp file
  end
  htmlfile.unlink
  return self
end
def enqueue_generate_letter_preview
  if Resque.inline
    Thread.new do
      Resque.enqueue(GenerateLetterPreview, id)
    end
  else
    Resque.enqueue(GenerateLetterPreview, id)
  end
end
def set_sent_at
  self.sent_at =Time.now
end
def create_theme_usage_log
  if _official_theme=custom_theme.try(:official_theme)
    ThemeUsageLog.where(letter_id:
        id).first_or_create.update_attributes(official_theme_
        id: _official_theme.id,
        created_at: sent_at)
  end
end
def send_at_a_future_date?
  future_mailing_date.present?
end
def retrieved! user
  # for physical letters missing addresses,
  # after the recipient has signed up and provided their
      address,
  # and after the admin has mailed the letter,
  # and then the user opens the new retrieval link included
      on the last page of their letter,
  # then we should remove the retrieval_code (here)
  # and set the delivery status to :delivered (below)
  if !is_digital && postal_sent? && recipient.present?
    return if recipient !=user
    self.retrieval_code=nil
  end
  # self.human_recipient_location=:counter
  # set delivery status for digital and physical letters that
      have been sent
  if is_digital
    # NOTICE: should just use set_recipient directly, not:
    # self.send_to_type='uid'
    # self.send_to =user.id
    # because when the user is not activated it just set the
        user as whitelist
    set_recipient(user)
    digital_deliver
  else
    if postal_sent?
      set_recipient(user)
      postal_retrieve
    else
      # for physical letters without lettrs account,
      generate_retrieval_code
      save!
    end
  end
  Rails.logger.debug "\r\n#{Time.now} Letter
      letter#retrieved!\r\nLETTER:
      #{self.inspect}\r\nUSER:#{user.inspect}\r\n"
end

# options can contain a :subject and/or :body parameter to
    override the
# default message

def deliver_to_linkedin_user(linkedin_uid=nil, options={ })
  if linkedin_uid
    self.send_to =linkedin_uid
  else
    linkedin_uid=send_to
  end
  raise 'linkedin_uid must be present' unless linkedin_uid
  self.send_to_type='linkedin'
  match_recipient!
  if recipient
    digital_deliver
  else
    if author.linkedin_auth
      options.delete_if {|k, v| v.blank?}
      subject=options[:subject] ||
          I18n.t('delivery.letter.send_to_linkedin.default_mes-
          sage_subject')
      body=options[:body] ||
          I18n.t('delivery.letter.send_to_linkedin.default_mes-
          sage_body')
      retrieval_link=
      Rails.application.routes.url_helpers.letter_retrieval_url
          (retrieval_code)
      body<<' '<<retrieval_link
      begin
        author.linkedin.post_private_message(linked-
            in_uid, subject, body)
        digital_deliver
      rescue OAuth2::Error=>ex
        if ex.response.status==401
          errors.add(:base, :linkedin_unauthorized)
```

```
        else
            errors.add(:base, :linkedin_500)
            logger.warn "LinkedIn error for user:
               #{author.id},\n #{ex.response}"
          end
          false
        end
      else
        errors.add(:base, :linkedin_unauthorized)
        false
      end
    end
  end
  def match_recipient!
    # Rails.logger.debug "**"* 10+"trying to find the recipi-
       ent"
    case send_to_type
    when 'uid'
      _recipient=send_to_user
      if _recipient
        if _recipient.activated?
          set_recipient(_recipient)
        else
          self.whitelist=Whitelist.find_or_create_
             by(email: _recipient.email)
        end
      end
    when 'email', 'google'
      self.send_to   =Concerns::EmailNormalizer::normal-
         ized_email(send_to)
      return if send_to.blank?
      if _recipient=User.find_by_email(send_to)
        if _recipient.activated?
          set_recipient(_recipient)
        else
          self.whitelist=Whitelist.find_or_create_
             by(email: _recipient.email)
        end
      else
        self.whitelist=Whitelist.find_or_create_by(email:
           send_to)
      end
    when 'linkedin'
      if auth=Authentication.where(provider: 'linkedin', uid:
         send_to).first and
        auth.user and auth.user.activated?
        set_recipient(auth.user)
      end
    end
  end
  def set_recipient(user)
    self.recipient_id=user.id
    self.allow_public=true                                    if
       self.recipient_id==self.author_id # if the user emails to
       self
    set_to_location_for_digital_delivery if digital?
    return self
  end
  def set_letter_address(_address_attributes)
    letter_address.destroy if letter_address.present?
    create_letter_address_address_attributes
  end
  def                create_transaction_from_payment_result!
     payment_gateway_result=nil, promotion
     =nil
    # For mailing_address_email, when the recipient's
       address is blank,
```

```
    delivery_state_changed and letter.letter_transaction.
       create don't happen at the same
    time, so need initial the delivery_state's value as 1.
    create_letter_transaction(
      user_id: author_id,
      letter_id: id,
      promotion_id: promotion.present? ? promotion.id : nil,
      price: payment_gateway_result.present? ?
      payment_gateway_result.amount : 0,
      remote_transaction_id: payment_gateway_result.pre-
         sent? ?
      payment_gateway_result.id : nil,
      remote_transaction_status: payment_gateway_result.
         present? ?
      payment_gateway_result.status : nil,
      delivery_state: delivery_state
    )
  end
  def                         save_transaction_and_deliver!
     payment_gateway_result=nil, promotion=nil
    create_transaction_from_payment_result!(payment_gate-
       way_result, promotion)
    postal_deliver
  end
```

Disclosed below is a Ruby on Rails® implementation of a code snippet from a computer program code executed by the personal communication system 203 exemplarily illustrated in FIG. 2, for determining a location of a recipient of a personalized communication and calculating a distance between a sender and the recipient of the personalized communication:

```
# distance from the writer - from_location to recipient - to_location

# setting the to_address based on the recipient's mailing address in [
settings / mailing
        address ]

def set_to_location_for_physical_delivery
    _address = letter_address
    return if from_location.blank? || _address.blank? ||
    _address.lat.blank? ||
    _address.lng.blank?
    self.build_to_location(
        locality:         _address.city,
        administrative_area_level_1: _address.state,
        country:          _address.country,
        postal_code:      _address.zipcode,
        lat:              _address.lat,
        lng:              _address.lng
    )
    calculate_distance
end

# setting the to_location based on the user's location in settings/profile

def set_to_location_for_digital_delivery
    return unless recipient
    return if from_location.blank?
    to_location.destroy if to_location.present? # Rewrite to_location
    if recipient.lat.blank? || recipient.lng.blank?
        address = recipient.country + " postal code " + recipient.zipcode
        location = GeocoderMethods.search(address)
        unless location.blank?
            recipient.lat = location["lat"]
            recipient.lng = location["lng"]
            recipient.save unless recipient.new_record?
            build_to_location(
                :locality => location["locality"],
                :administrative_area_level_1 =>
                location["administrative_area_level_1"],
                :country => location["country"],
                :postal_code => location["postal_code"],
```

```
            :lat => location["lat"],
            :lng => location["lng"]
        )
    end
else
    _options = {
        :locality    =>    recipient.city,
        :country     =>    recipient.country,
        :postal_code =>    recipient.zipcode,
        :lat         =>    recipient.lat,
        :lng         =>    recipient.lng }.reject { |k,v| v.nil? }
    build_to_location _options
    end
    calculate_distance
end
def calculate_distance
    return nil if from_location.blank? || to_location.blank?
    origin = [from_location.lat, from_location.lng]
    destination = [to_location.lat, to_location.lng]
    distance_km = Geocoder::Calculations.distance_between(origin,
        destination, {:units
            => :km, :method => :spherical})
    distance_value = (distance_km * 1000).to_i
    distance_text = (distance_value/1609.344*10).ceil/10.0
    self.distance = { }
    self.distance["text"] = distance_text.to_s + " mi"
    self.distance["value"] = distance_value
end
```

Disclosed below is a Ruby on Rails® implementation of a code snippet from a computer program code executed by the personal communication system 203 exemplarily illustrated in FIG. 2, for managing display of personalized communications on the GUI 205 of the personal communication system 203 exemplarily illustrated in FIG. 2:

```
# "Some language codes also include a country code, like zh-CN or zh-TW"
def detect_language
    if content.present?
        _lan = CLD.detect_language(content)
        self.original_language = _lan[:code] if _lan.present?
    end
    original_language
end
def clear_draft_type
    self.draft_type = nil
end

# Link existing LetterAttach with the id of value of attribute 'cached_id'.
# Note that only the LetterAttach without a letter_id can be linked.
# Furthermore, the 'position' attribute of LetterAttach can also be set in this method

def link_existing(attrs)
    if cached_id = attrs['cached_id']
        attachment = LetterAttach.where(id: cached_id).first
        if attachment and attachment.letter_id.blank?
            attachment.update_attributes(attrs.slice(:position).merge({letter_id: id }));
        end
        true
    else
        false
    end
end
def can_be_tagged_by?(user)
    if user
        user == author or (!open_letter? and user == recipient)
    else
        false
    end
end
private
def need_mailing_address
    errors.add(:base, "letter address can't be blank") if letter_address.blank?
    end
end
```

Disclosed below is a Ruby on Rails® implementation of a code snippet from a computer program code executed by the personal communication system 203 exemplarily illustrated in FIG. 2, for an action controller that defines filters for viewing personalized communications:

```
//CONTROLLER
class LettersController < InheritedResources::Base
    include LettrsSearch
    before_filter :require_login, except: [:explore, :show, :short_url, :fridge, :update_coord,
        :print, :retrieve_letter, :preview, :translate]
    before_filter :who_can_see, only: [:show, :short_url, :print, :like, :unlike]
    before_filter :format_date, only: [:create, :update]
    before_filter :prepare_themes, only: [:new, :edit]
```

```
before_filter :get_client_language, only: [:show, :short_url]
after_filter :mark_as_read, only: [:show, :short_url]
respond_to :html, :mobile
caches_action :explore, cache_path: Proc.new {
    "explore_#{Digest::SHA1.hexdigest(params.to_query)}#{current_user ?
        current_user.id : ''}"
}, expires_in: 1.minute
def explore
    return redirect_to root_url, status: 301 if request.fullpath == "/explore"
    @letters = search_or_filter_letters(params)
    respond_with @letters, responder: LettersResponder
end
def drafts
    @letters = search_or_filter_letters(params.merge({sort: 'updated_at-desc'}))
    respond_with @letters, responder: LettersResponder
end
def drawer
    @total_writing_time = current_user.sent_letters.drawer.sum(:writing_time)
    @letters = search_or_filter_letters(params)
    respond_with @letters, responder: Letters Responder
end
def counter
    @letters = search_or_filter_letters(params)
    respond_with @letters, responder: LettersResponder
end
def fridge
    @user = User.find_by(username: params[:username])
    @letters = search_or_filter_letters(params.merge({user_id: @user.id}))
    ViewLog.add!(:target => @user, :viewer => current_user)
    respond_with @letters, responder: LettersResponder
end
def shoebox
    @letters = search_or_filter_letters(params)
    respond_with @letters, responder: LettersResponder
end
def new
    # NOTICE: here use create will not save the letter to the db
    @letter = current_user.sent_letters.build
    if params[:to] || params[:pobox]
        if params[:to]
            @recipient = User.find_by_username(params[:to])
        elsif params[:pobox]
            @recipient = User.find_by_po_box(params[:pobox])
        end
```

Disclosed below is a Ruby on Rails® implementation of a code snippet from a computer program code executed by the personal communication system 203 exemplarily illustrated in FIG. 2, for displaying notifications, for example, for a successful login, a successful activation of a user account, etc., to a sender via the GUI 205 of the personal communication system 203, and redirecting the sender to the write interface section 401 exemplarily illustrated in FIGS. 4A-4B, to proceed with composing, editing, updating, and/or managing a personalized communication:

```
if @recipient.blank?
    flash.now[:alert]=t('letters.write_to.error_user')
else
    @letter.send_to =@recipient.id
    @letter.send_to_type='uid'
end
end
@letter.save_draft
# NOTE: This is to here to persist the flash message from
    the login redirection.
# Without this, the user will not see the activation/login
    success messages.
flash.keep
return redirect_to edit_letter_path(@letter)
# @letter_theme=@letter.theme || @default_theme
# @writing_time_log=@letter.writing_time_logs.build
end
def edit
    @letter=current_user.sent_letters.drafts.find(params[:id])
    if @letter.send_to_type && @letter.send_to_type=='uid'
        &&
        @letter.send_to.present?
        @recipient=User.find @letter.send_to
    end
    @is_new_letter=false
    if @letter.content.blank? && @letter.custom_theme.
        blank? &&
        @letter.letter_attachs.blank? && @letter.from_loca-
            tion.blank? &&
        @letter.tags.blank?
        @is_new_letter=true
    end
    @letter_theme=@letter.theme
    @recipient=@letter.recipient if @letter.recipient.present?
    @writing_time_log=@letter.writing_time_logs.build
end
def update
    @letter=current_user.sent_letters.find(params[:id])
    @old_letter_tag_ids=@letter.letter_tag_ids
```

```ruby
    if params[:letter]['letter_tags_attributes']
      params[:letter]['letter_tags_attributes']=
        params[:letter]['letter_tags_attributes'].collect {|atts|
          atts[1]}
    end
    if @letter.draft?
      after_updating(@letter.update_attributes(params[:letter]))
    elsif @letter.new?
      @letter.attributes=params[:letter]
      after_updating(@letter.save_draft)
    end
  end
  def show
  end
  def print
    render :print, layout: 'print'
  end
  def preview
    @letter=Letter.or({ id: params[:id] }, { short_id: params[:id] }).first
    @host=APP_CONFIG['host']
    render layout: false
  end
  def destroy
    current_user.delete_letter Letter.find(params[:id])
    redirect_to :back
  rescue ActionController::RedirectBackError
    redirect_to root_path
  end
  def move_to_fridge
    letter=current_user.received_letters.find(params[:id])
    letter.make_public_or_send_request!
    flash[:notice]=letter.allow_public ? "Moved to fridge" : "Request sent"
    # expire fridge cache: if now on fridge
    expire_fragment("fridge_#{current_user.id}") if letter.on_fridge?
    redirect_to user_home_path(username: current_user.username)
  end
  def move_to_shoebox
    if letter=current_user.received_letters.find(params[:id])
      # expire fridge cache: if it was on the fridge
      expire_fragment("fridge_#{current_user.id}") if letter.on_fridge?
      letter.make_private!
    end
    redirect_to shoebox_path, notice: "Moved to shoebox"
  end
  def allow
    letter=current_user.sent_letters.find(params[:id])
    letter.grant_public!
    # expire fridge cache: moved to fridge by grant_public!
    expire_fragment("fridge_#{letter.recipient_id}")
    redirect_to :root, notice: t("letters.allow_public")
  end
  def short_url
    render_404 if @letter.blank?
    # check if request is coming from facebook agent
    if render_for_robot?
      logger.info "--- render for robot true ---"
      render :show
    elsif mobile?
      logger.info "--- render for mobile ---"
      render :show
    else
      ViewLog.add!(:target=> @letter, :viewer=>current_user)
      # Handle xhr requests when clicking a list item for a popup view
      if request.xhr?
        render :show
      # Handle normal request when the opening /l/{short_id} links
      else
        if @letter.recipient.present?
          if current_user # if logged in, then show the fridge letter is on
            redirect_to user_home_path(username: @letter.recipient.username, anchor: params[:id])
          else # else show the landing page
            redirect_to root_path(anchor: params[:id])
          end
        else
          if @letter.author==current_user
            redirect_to drafts_path(anchor: params[:id])
          else
            render_404
          end
        end
      end
    end
  end
  def page_number
    params[:page] || 1
  end
  def update_coord
    letter=current_user.fridge.where(short_id: params[:id]).first if current_user
    # expire fridge cache: letter coords changed
    expire_fragment("fridge_#{current_user.id}")
    # Get the current max z index value
    max_z=current_user.fridge.with_coords.collect{|l| l.coord["z"].try(:to_i)}.compact.max || 0
    if letter and letter.update_attributes(coord: params[:coord].merge(:z=>(max_z+1)))
      render json: { success: true}
    else
      render json: { success: false}
    end
  end
  def report
    if @letter=Letter.fridge.find(params[:id])
      comment_id=nil
      if params[:comment_id].present?
        @comment=@letter.comments.find(params[:comment_id])
        comment_id=@comment.id
      end
      AdminMailer.report(letter_id: @letter.id,
        report_content: params[:report_content],
        comment_id: comment_id
      ).deliver
    end
    render :json=>{success: true}
  end
  def retrieve_letter
    if @letter=Letter.where(retrieval_code: params[:retrieval_code]).first
      if @letter.postal_ready_for_mailing?
        return redirect_to root_path, notice: "I don't know how you got this link, but ..."
```

```
    end
    if current_user
      @letter.retrieved!(current_user)
      if @letter.postal_waiting_address?
        redirect_to    mailing_address_settings_path,
          notice: "Please provide your mailing
address!"
      elsif @letter.postal_ready_for_mailing?
        # letters sent to unknown email, but retrieved by
          existing user with user_address
        redirect_to root_path, notice: 'Your letter will be
          on its way soon!'
      else
        redirect_to    counter_path,    notice:    "Letter
          retrieved!"
      end
    else
      session[:return_to_url]=request.fullpath
      # User is not logged in, so store the retrieval_code in
        a cookie for retrieval after
      login or registration
      add_to_retrieval_code_cookie(params[:retrieval_
        code])
    end
  else
    redirect_to root_path, notice: "Unable to find your
      letter."
  end
end
def like
  like_log=@letter.like_logs.build(liker_id:    current_us-
    er.id)
  if like_log.save
    @letter.reload # reload to check the liked_by_admin
    Notification.liked(@letter, current_user)
    render :json=>{
      :result=>true,
      :liked=>true,
      :url=>unlike_letter_path(@letter),
      :liked_by_admin=>@letter.liked_by_admin?,
      :message=>like_text(@letter, is_web: true)
    }
  else
    render :json=>{
      :result=>false,
      :message=>like_log.errors.full_messages.join(",")
    }
  end
end
def unlike
  like_log=@letter.like_logs.find_by_liker_id(current_us-
    er.id).first
  if like_log
    like_log.destroy
    @letter.reload
    render :json=>{
      :result=>true,
      :liked=>false,
      :url=>like_letter_path(@letter),
      :liked_by_admin=>@letter.liked_by_admin?,
      :message=>like_text(@letter, is_web: true)
    }
  else
    render :json=>{
      :result=>false,
      :message=>'Sorry, but you are not allowed to do
        this'
    }
  end
end
def likers
  @likers=@letter.liker_exclude_admin_and_user(curren-
    t_user)
  render :json=>{
    likers:   @likers.collect{|u|   {name:   u.name,   po_
      box_number: u.po_box_number, link:
      u.link, avatar: u.avatar.thumb.url} }
  }
end
def translate
  @letter=Letter.or({ id: params[:id] }, { short_id: params
    [:id] }).first
  _target=params[:target]
  if _target
    _content=@letter.translate_to !(_target)
    _content=letter_content_renderer(_content) if _con-
      tent.present?
    render :json=>{result: true, content: _content} and
      return if _content.present?
  end
  render :json=>{result: false}
end
private
def extract_locale_from_accept_language_header
  if   request.env['HTTP_ACCEPT_LANGUAGE'].pres-
    ent?
    request.env['HTTP_ACCEPT_LANGUAGE'].scan(/^
      [a-z]{2}/).first
  else
    nil
  end
end
def get_client_language
  @language_code=extract_locale_from_accept_
    language_header
  if @language_code
    _lan=LanguageList::LanguageInfo.find(@language_
      code)
    @language_name=_lan.name
  end
end
# Render the show view for any bots
def render_for_robot?
  logger.info request.env['HTTP_USER_AGENT']
  _robots=%w(facebookexternalhit googlebot twitterbot/)
    .join('|')
  request.env['HTTP_USER_AGENT'].try(:match,
    /(#{ _robots})/i).present?
end
def prepare_themes
  @default_theme   =OfficialTheme.default_includes.de-
    fault_theme
  @official_themes =OfficialTheme.open
  @papers  =Paper.enabled.for_digital
  @fonts   =Font.enabled
  @ink_colors =InkColor.enabled
end
def who_can_see
  if @letter=Letter.or({ id: params[:id] }, { short_id:
    params[:id] }).first
```

```
if !@letter.public?
  if logged_in?
    if !@letter.related_to?(current_user)
      if request.xhr?
        render inline: t('errors.letter_not_exist')
      else
        flash[:notice]=t('errors.letter_not_exist')
        redirect_to(root_path) and return
      end
    end
  else
    session[:return_to_url]=request.url if
Rails.application.config.sorcery.save_return_to_url
    redirect_to(login_path, notice: "Please login first")
      and return
    end
  end
else
  render inline: t('errors.letter_not_exist')
end
end
def mark_as_read
  @letter.mark_as_read!  if  current_user  &&
    current_user.id==@letter.recipient_id
end
def format_date
  if params[:letter][:date].blank?
    params[:letter][:date]=Date.today
  else
    params[:letter][:date]=Date.strptime(params[:letter][:
      date], '%B %d, %Y')
  end
rescue
  params[:letter][:date]=Date.today
end
def deliver_it_as_digital?
  params[:commit]=="digital"
end
def deliver_it_as_real?
  params[:commit]=="physical"
end
def after_updating(cond)
  if cond
    if request.xhr?
      case @letter.draft_type
      when 'digital_open'
        @letter.make_open!
        @letter.move_to_fridge!
        flash[:notice]="OK, delivered your open letter to the public!"
        render :json=>{ new_page: true, url: user_home_path(username:
current_user.username)} and return
      when 'digital_private'
        render :json=>{ url: new_letter_type_path(@letter)} and return
      when 'physical'
        render :json=>{ new_page: true, url: new_letter_address_path(@letter)} and
return
      else # For normal flow, without seting letter type before.
        _result={
          letter_id: @letter.id,
          letter_tags_changed:    @old_letter_tag_ids
            !=@letter.letter_tag_ids,
          letter_tags: @letter.letter_tags.collect{|lt| {letter_tag_id: lt.id, tag_id: lt.tag_id} }
        }
        render json: _result and return
      end
    else
      # physical letter
      redirect_to    new_letter_address_url(@letter,
        :protocol=>secure_protocol) and
      return if deliver_it_as_real? && @letter.can_deliver?
      # digital letter
      redirect_to   new_letter_type_path(@letter)   and
        return if deliver_it_as_digital? &&
      @letter.can_deliver?
      # draft
      redirect_to drafts_path, notice: "Saved as draft"
    end
  else
    flash[:notice]=@letter.errors.full_messages.join(',')
    if @letter.errors.include?(:writing_time_logs)
      raise flash[:notice]
    else
      redirect_to action: :edit
    end
  end
end
def reindex_z!(letters)
  _letters=letters.with_coords
  if _letters.present?
    _index=0
    _letters_sorted=_letters.map { |l| [l.z.to_i, l] }.sort.map
      {|l| l[1] }
    _letters_sorted.map { |l| l.update_attribute :z, _index
      +=1}
  end
end
end
```

Disclosed below is a Ruby on Rails® implementation of a code snippet from a computer program code executed by the personal communication system 203 exemplarily illustrated in FIG. 2, for allowing a sender and/or a recipient to configure settings on the GUI 205 of the personal communication system 203 exemplarily illustrated in FIG. 2, for composition and display of personalized communications:

```
//VIEWS - new
= render 'form'
//VIEWS - form
- title t("page_title.#{params[:controller]}_#{params[:action]}")
= render 'form_subnavigation'
- if @letter.theme.present?
    - letter_style = @letter.theme.as_style(:desk)
- else
    - letter_style = default_theme.as_style(:desk)
= render 'letters/aviary'
#letter_form_wrapper.letter_form_wrapper.write_letter
```

```
= simple_form_for @letter, :as => 'letter', :url => letter_path(@letter) do |f|
    = f.error_notification
    = f.hidden_field 'send_to'
    = f.hidden_field 'send_to_type'
    = f.hidden_field 'recipient_id'
    -# NOTICE: this is used for form submit, not ajax submit(ajax submit can not upload
        file) like: delivery & auto save
    .hidden
        = f.simple_fields_for :letter_signature, @letter.letter_signature do |f1|
            = f1.file_field :image
    = hidden_field_tag :is_new_letter, @is_new_letter
    = hidden_field_tag :writing_time, @letter.writing_time
    = hidden_field_tag :minimum_writing_duration, @letter.minimum_writing_duration
    = hidden_field_tag :is_changed, '0'
    = f.fields_for :writing_time_logs, @writing_time_log do |wt|
        = wt.hidden_field :start_at
        = wt.hidden_field :end_at
    - if @recipient
        #write_to_wrapper
            #write_to_tip
                = t(".write_to_tip")
                = image_tag 'letter_form/arrow2.png', id: 'write_to_tip_arrow'
            = render partial: "shared/avatar_snippet_for_pre_addressed_letter", locals: {user:
                @recipient}
    #input_theme_wrapper.letter_content_theme{ style: letter_style }
        .date_location_wrapper
            = f.input :date, label: false, input_html: { class: 'date', value: "#{
                @letter.date.strftime('%B %-d, %Y') if @letter.date }", readonly: 'true' }
            #show_location
                = [@letter.from_location.locality, @letter.from_location.country].join(', ') unless
                    @ letter.from_location.blank?
        = f.input :content, label: false, as: :text, placeholder:
            t('letters.form.content_placeholder'), :wrapper_html => { :class => 'clearfix
            letter_content_wrapper' }
        = f.hidden_field 'custom_theme[paper_id]', value: @letter.theme.paper_id, id:
            'custom_theme_paper_id'
        = f.hidden_field 'custom_theme[font_id]', value: @letter.theme.font_id, id:
            'custom_theme_font_id'
        = f.hidden_field 'custom_theme[ink_color_id]', value: @letter.theme.ink_color_id,
            id: 'custom_theme_ink_color_id'
    #hidden_fields_author_tags
        - @letter.letter_tags.each do |letter_tag|
            = hidden_field_tag 'letter[letter_tags_attributes][‘+letter_tag.tag_id.to_s+’][id]',
                letter_tag.id
            = hidden_field_tag 'letter[letter_tags_attributes][‘+letter_tag.tag_id.to_s+’][tag_id]',
                letter_tag.tag_id
            = hidden_field_tag
                'letter[letter_tags_attributes][‘+letter_tag.tag_id.to_s+’][_destroy]' , false, id:
                letter_tag.tag_id
    #hidden_fields_attachments
        - @letter.letter_attachs.each do |attachment|
            = hidden_field(:letter, :letter_attach_ids, value: attachment.id, name:
                "letter[letter_attach_ids][ ] ")
    #hidden_fields_from_location
        - if @letter.from_location.present?
            = f.simple_fields_for :from_location, @letter.from_location do |f1|
                = f1.hidden_field :locality
                = f1.hidden_field :administrative_area_level_1
                = f1.hidden_field :country
                = f1.hidden_field :postal_code
                = f1.hidden_field :lat
                = f1.hidden_field :lng
                = f1.hidden_field :address
                = f1.hidden_field :id
                = f1.hidden_field :_destroy
    .actions
        = link_to t('.actions.finish_later').html_safe, 'javascript:void(0)', class:
            :letter_form_action, id: :save_letter
.new_delivery
    .clock_wrapper
        .clock-min-max-toggle#clock-min-max-toggle
            %i.icon-plus.hidden
            %i.icon-minus
        .clock_image_wrapper
            .clock_cover.top
            .clock_image= image_tag current_user.custom_writing_desk_clock.try(:image_url)
            .clock_cover.bottom
        .clock_text
            .writing_time_counter.hidden
```

```
                        %span
                            =format_time_to_hms(@letter.writing_time)
                        %div has been spent
                        %div on this letter
                - admin_hint = 'For admins: hold alt/option key to bypass the writing duration check!'
                = link_to t('.actions.deliver').html_safe, 'javascript:void(0)', title:
                    current_user.is_admin && admin_hint,
                    class: :letter_form_action, id: :letter_form_delivery, data: { url: delivery_path }
- content_for :body_start do
    = render 'shared/preloader_overlay'
//VIEWS - from subnavigation
- content_for :subnavigation do
    %ul.desk_subnavigation_links.center
        %li.dropdown
            = link_to 'themes', 'javascript: void(0);', class: 'themes_link dropdown-link'
            .dropdown-menu#themes_dropdown{style: "display:#{@is_new_letter ? 'block':
'}"}
                .dropdown_arrow
                .dropdown_done_btn= t('actions.done')
                % section
                    .subtitle
                        = 'Select a theme for your letter'
                        %span
                    #letter_form_theme_options
                        #theme_carousel.carousel} data: { per: 7, width: 90, height: 94 }}
                            - @official_themes.each do |theme|
                                = link_to '', 'javascript:void(0)',
                                    id: theme.name.parameterize,
                                    class: [:theme_option, (:active if @letter.new_record? && theme ==
@ default_theme)],
                                    data: { paper_id: theme.paper_id.to_s,
                                        font_id: theme.font_id.to_s,
                                        ink_color_id: theme.ink_color_id.to_s,
                                        image_preload: theme.background_image(:desk) },
                                    style: "background: transparent url('#{ theme.icon.url(:thumb)}') center
center no-repeat;",
                                    alt: theme.description || theme.name,
                                    title: theme.description || theme.name
                %section.create_custom_theme.hidden
                    .subtitle
                        %p Or...
                        Mix and match to make your own theme
                        %span
                    #letter_form_create_custom_theme
                        .input.paper
                            .image
                                - @papers. each do |paper|
                                    - is_selected = @letter_theme.paper.id == paper.id
                                    .preview{ class: "custom_theme paper_option #{ 'selected' if is_selected}",
id: "icon_#{paper.id}" }
                                        -# = image_tag paper.icon.full
                            .custom_theme_label paper
                            = custom_theme_selection_for @letter_theme, @papers
                        .input.font
                            .image
                                - @fonts.each do |font|
                                    - is_selected = @letter_theme.font.id == font.id
                                    .preview{ class: "custom_theme font_option #{ 'selected' if is_selected}", id:
"icon_#{font.id}", style: font.as_style(:full) }= font.family
                            .custom_theme_label font
                            = custom_theme_selection_for @letter_theme, @fonts
                        .input.color
                            .image
                                - @ink_colors.each do |ink_color|
                                    - is_selected = @letter_theme.ink_color.id == ink_color.id
                                    .preview{ class: "custom_theme ink_color_option #{ 'selected' if
is_selected}", id: "icon_#{ink_color.id}", style: "background-color:
#{ink_color.code}" }
                            .custom_theme_label ink color
                            = custom_theme_selection_for @letter_theme, @ink_colors
        %li.dropdown
            = link_to attachment_counter_label(@letter).html_safe, 'javascript: void(0);', class:
'paperclip_link dropdown-link', id: 'attachment_count'
            .dropdown-menu#paperclips_dropdown
                .dropdown_arrow
                    .dropdown_done_btn= t('actions.done')
                    #attach_actions
                        = link_to "select photos", "#", id: "pickfiles", class: 'tape_200x40', title:
t("title_alt.upload")
```

```
                .subtitle= 'Select photos from your computer to add to your letter'
                #letter_attachs.upload_wrapper
                    #attachs_bg
                        .attachs#filelist
                            - @letter.letter_attachs.each do |attach|
                                .attach_image
                                    .settings
                                        .attachment_action.delete_attachment= t('actions.delete')
                                        .attachment_action.edit_attachment{ data: { "target-url" =>
 asset_url(attach.image.url(:full)) } }= t('actions.edit')
                                    = image_tag attach.image.url(:mini), id: attach.id, data: { "access-token" =>
 attach.access_token }
 = render :partial => 'widgets/tags', :locals => {:tags => @ letter.author_letter_tags}
 %li.dropdown
        = link_to 'locate', 'javascript: void(0);', class: 'locate_link dropdown-link', id:
        'locate', data: {first: '1'}
        .dropdown-menu#locate_dropdown
            .dropdown_arrow
            .dropdown_done_btn= t('actions.done')
            #geolocation
                %p
                    %input{:type => "checkbox", :id => "gelocate_me", :checked => true}
                    %label{:for => "gelocate_me"}
                        Save location information by filling in an address:
                %div
                    %label From:   
                    %input{:type => "text", :id => "from_location"}
                    %input{:type => "button", :id => "from_btn", :value => "Search"}
            #map_box
                #map_canvas
```

Disclosed below are examples of Ruby on Rails® implementations of software code snippets that allow the personal communication system 203 exemplarily illustrated in FIG. 2, to determine an optimal time condition for composing a time based personalized communication, where the preliminary time condition configured by the personal communication system 203 can be increased, for example, by a system administrator of the personal communication system 203, a sender of a personalized communication, or a recipient of a personalized communication. If the recipient sets the recipient configured time condition higher than the preliminary time condition or the sender configured time condition, then the recipient configured time condition serves as the optimal time condition for composing the personalized communication. The personal communication system 203 allows for activation of the personalized communication when the optimal time condition is met.

Disclosed below is a Ruby on Rails® implementation of a code snippet from a computer program code executed by the personal communication system 203 exemplarily illustrated in FIG. 2, for defining models, constants, fields, scopes, and associations for time based personal communication:

```
// MODEL
class User
    include Mongoid::Document
    include Mongoid::Timestamps
    include Sunspot::Mongoid2
    include Concerns::User::SocialAuthentications
    include Concerns::User::PoBoxNumbers
    include Concerns::User::BraintreePayment
    include Concerns::EmailNormalizer
    authenticates_with_sorcery!
    #
    # CONSTANTS
    #
    USERNAME_BLACKLIST = %w(admin admins letter letters letter_attach
            letter_attachs developer developers
            application home oauths oauth packages package desk counter shoebox fridge explore
                legacy_letters legacy_letter
            whitelist whitelists user users setting settings login logout register
            message messages contact tags tag user_session user_sessions 1 anonymous retrieve
                resque
            about faq privacy privacy_policy terms_of_service refund refund_policy foundation
                drafts password_resets)
    CSV_EXPORT_FIELDS = ['name', 'email', 'username', 'zipcode', 'country',
            'updated_at']
    #
    # FIELDS
    #
    field :name
    field :username
    field :zipcode
```

```
field :city
field :country, default: "United States"
field :is_admin, type: Boolean, default: false
field :send_comments_notification, type: Boolean, default: true
field :send_add_to_address_book_notification, type: Boolean, default: true
field :push_c, as: :push_on_comments, type: Boolean, default: true
field :push_p, as: :push_on_added_to_address_book, type: Boolean, default: true
field :lat
field :lng
field :ios_device_token, type: String
field :registered_via, type: Symbol
field :activation_last_reminded_at, type: DateTime
mount_uploader :avatar, AvatarUploader
# total number of times the user's fridge has been viewed + the letters_view_count
field :view_count, type: Integer, default: 0

# Sum of letter views from letters you've written OR received

# NOTE: to avoid duplicate counts, the latter excludes letters sent to yourself.

field :letters_view_count, type: Integer, default: 0

# Sum of deprecated fridge views + sum of LegacyLetter views

# Deprecated fridge views:

# LegacyLetter views:
# - The LegacyLetter model was destroyed before removing the total views they
# contributed to this count.

field :legacy_letters_view_count, type: Integer, default: 0
field :sent_letters_count, type: Integer, default: 0
field :open_letters_count, type: Integer, default: 0
field :remote_customer_id
field :remote_payment_method, type: Hash
field :letter_comments_count, type: Integer, default: 0
field :po_box_number, type: Integer
field :minimum_writing_duration, type: Integer
field :bio, type: String
field :fridge_bg_color, type: String
mount_uploader :fridge_cover, FridgeCoverUploader
attr_accessor :minimum_writing_duration_minutes,
        :minimum_writing_duration_seconds

# SCOPES

scope :admin, where(is_admin: true)
scope :pending, ->(email) { where(email: email, activation_state: 'pending') }
scope :activated, where(activation_state: 'active')
scope :active, where(:last_activity_at.gte => 1.month.ago)
scope :abandoned, where(:last_activity_at => nil)
scope :has_social, ->(sns) { where(:_id.in => Authentication.send(:sns,
        sns.to_sym).map(&:user_id)) }
scope :sort_by_view_count, order_by(view_count: :desc)
scope :activation_state, ->(state) { where(activation_state: state) }
scope :ios, where(:ios_device_token.exists => true)
scope :country, ->(country) { where(country: country) }
scope :find_all_by_po_box, ->(_po_box_number) { where(po_box_number:
        _po_box_number) }
scope :find_like_name, ->(query) { any_of({ name: /#{Regexp.escape(query)}/i })
        }
scope :find_like_username, ->(query) { any_of({ username: /#{Regexp.escape(query)}/i
        }) }
scope :find_like_email, ->(query) { any_of({ email: /#{Regexp.escape(query)}/i })
        }
scope :find_like, ->(query) {
        find_like_name(query).find_like_username(query).find_like_email(query) }
scope :registered_via_web, -> { any_of(registered_via: :web).any_of(registered_via:
        nil) }

# ASSOCIATIONS

has_many :authentications, dependent: :destroy, autosave: true
has_many :sent_letters, class_name: "Letter", foreign_key: "author_id", inverse_of:
        :author, dependent: :destroy
has_many :received_letters, class_name: "Letter", foreign_key: "recipient_id",
        inverse_of: :recipient, dependent: :destroy
has_many :open_letters, foreign_key: "author_id"
has_one :user_address, autosave: true
```

```
has_many :letter_transactions
has_many :user_magnets

# NOTE: When a user is destroyed, destroy any logs where that user is
#       being viewed (where loggable_id = this user).

#       The { autosave: true } option is required to destroy the associated
#       records when this object is destroyed:

#       AutosaveAssociation is a module that takes care of automatically saving
#       associated records when their parent is saved. In addition to saving, it
#       also destroys any associated records that were marked for destruction.

has_many :view_logs, :as => :loggable, autosave: true, dependent: :destroy

#       Only in the case of this user being the viewer, keep the view log
#       when the user is destroyed (because the loggable entity still exists).

has_many :viewed_items, class_name: 'ViewLog', foreign_key: 'viewer_id',
        dependent: :nullify

# User address book

has_and_belongs_to_many :address_book, class_name: "User", foreign_key:
        "address_book_user_ids",
    inverse_of: nil, index: true
has_and_belongs_to_many :black_list, class_name: "User", foreign_key:
        "black_list_user_ids",
    inverse_of: nil, index: true
belongs_to :writing_desk_clock, index: true
has_many :reading_time_logs
attr_protected :crypted_password, :is_admin
accepts_nested_attributes_for :authentications, :user_address

# VALIDATIONS

validates :name, presence: true, length: { maximum: 25 }
validates :username, presence: true, uniqueness: true
validates :country, presence: true
validates :zipcode, presence: true, format: { with: /^\d{5}([\-]\d{4})?$/, message:
        "format is wrong" }, if: lambda { |user| user.country == 'United States' }
validates :email, presence: true, uniqueness: true, email_format: true
validates :password, confirmation: true, length: { minimum: 6, too_short: "must have at
        least %{count} characters" }, on: :create
validates :password, confirmation: true, length: { minimum: 6, too_short: "must have at
        least %{count} characters" }, on: :change_password
validates_inclusion_of :registered_via, in: [:web, :iphone], allow_blank: true
validate :minimum_writing_duration_cannot_be_less_than_global
validates :bio, length: { maximum: 150, too_long: "%{count} characters is the
        maximum allowed" }
validate :validate_minimum_cover_size
searchable do
    text :name_autocomplete, as: 'name_autocomplete' do
        name
    end
    text :name, as: 'name_text'
    text :po_box_number
    string :id
    time :created_at
end

# CLASS METHODS

def self.to_csv(options = { })
    CSV.generate(options) do |csv|
        csv << CSV_EXPORT_FIELDS
        all.each do |user|
            row = CSV_EXPORT_FIELDS.map { |f| user[f] }
            csv << row
        end
    end
end
def self.find_by_username _username
    where(username: _username).first
end
def self.find_by_po_box _po_box_number
    where(po_box_number: _po_box_number).first
end
```

Disclosed below is a Ruby on Rails® implementation of a code snippet from a computer program code executed by the personal communication system 203 exemplarily illustrated in FIG. 2, for defining instance methods for verifying whether the determined optimal time condition is met while composing a personalized communication and before delivering the personalized communication to a recipient:

```

# INSTANCE METHODS

def minimum_writing_duration_cannot_be_less_than_global
    if minimum_writing_duration.present?
        if minimum_writing_duration <
            ProjectSetting.current.minimum_writing_duration
                errors.add(:minimum_writing_duration, "can't be less than
                    global value")
        end
    end
end
def as_json(opts=nil)
    default = { except: [:crypted_password, :salt], methods: [:errors] }
    default.merge!(opts) if opts.is_a?(Hash)
    super(default)
end
def country_code
    COUNTRY_CODES [self.country] if self.country
end

# Attributes

    def avatar=(new_file)
        if new_file.respond_to?(:original_filename)
            ext = File.extname(new_file.original_filename)
            new_file.original_filename = Time.now.to_i.to_s + ext
        end
        super(new_file)
    end
    def user_avatar(style = :thumb)
        self.avatar.url(style)
    end
    def link(opts = { })
        _url = "/" + username
        return generate_url_for(_url)
    end
    def profile_image_url(style = :thumb)
        generate_url_for user_avatar(style)
    end
    def location_short_name
        _name = [city, country].delete_if { |x| x.blank? }
        _name.join(', ')
    end
    def is_admin?
        !!self.is_admin
    end
```

Disclosed below is a Ruby on Rails® implementation of a code snippet from a computer program code executed by the personal communication system 203 exemplarily illustrated in FIG. 2, for managing user accounts of senders and/or recipients registered with the personal communication system 203:

```

# Activation Related Methods

attr_accessor :skip_activation
def activated?
    self.activation_state == 'active'
end
def skip_activation?
    skip_activation or has_facebook? or has_google?
end
# Sorcery Override / Monkey Patch - User Activation #setup_activation
def setup_activation
```

-continued

```
    if skip_activation?
        self.activation_state = 'active'
        self.activation_token = nil
        self.activation_token_expires_at = nil
    else
        super
    end
end
def set_activation_last_reminded_at!
    self.activation_last_reminded_at = DateTime.now
    self.save!
end

# Attributes

# Data

    def drafts
        sent_letters.drafts.default_includes.desc(:updated_at)
    end
    def fridge
        received_letters.fridge.default_includes.desc(:created_at)
    end
    def magnets
        Magnet.find user_magnets.map(&:magnet_id)
    end
    def comment_author?(comment)
        self == comment.author
    end
    def need_update_mailing_address?
        user_address.blank? && received_letters.physical.any?{|l|
            l.postal_waiting_address?}
    end
    def author? letter
        self == letter.author
    end
    def recipient? letter
        self == letter.recipient
    end
    def unread_letters
        received_letters.counter.unread
    end
    def has_unread_letters?
        unread_letters.present?
    end

# Data

# Actions

    def delete_letter letter
        return letter.destroy if self.author?(letter) && letter.draft?
        letter.update_attributes author_deleted: true if
            self.author?(letter) &&
                !letter.author_deleted?
        return letter.update_attributes recipient_deleted: true if
            self.recipient?(letter) &&
                !letter.recipient_deleted?
    end
    # NOTICE: Can be used when auto-saving feature is ok.
    def delete_unedited_letter
        letters = sent_letters.drafts.where(content: nil, :updated_at.lt =>
            Time.now - 1.day)
        letters.each do |l|
            l.destroy if l.unedited?
        end
    end
    def generate_username
        _username = self.username || self.name || "lettrsuser"
        unallowed_chars = /[^a-z0-9]/
        _username = _username.downcase.gsub(unallowed_chars, '')
        index = 0
        candidate = _username
        while USERNAME_BLACKLIST.include?(candidate) ||
            User.where(username:
                candidate ).exists?
                index+=1
```

```
            candidate = "#{_username}#{index}"
        end
        self.username = candidate
    end
    def generate_password
        self.password = self.password_confirmation =
        SecureRandom.base64(16)
    end
    #
    # VIEW COUNT METHODS
    #
    # letters_view_count
    # sum of sent letters view count + received letters view count
    (non-self recipient) +
            legacy letters view count
    #
    # view_count
    # sum of profile (fridge) views + letters_view_count
    #
    def total_letters_view_count
        _sent_view_count = sent_letters.map(&:view_count).sum
        _received_view_count = received_letters.regular.map { |l|
        l.sent_to_self? ? nil :
            l.view_count }.compact.sum
        _sent_view_count + _received_view_count +
        legacy_letters_view_count
    end
    def reset_letters_view_count!
        self.set :letters_view_count, total_letters_view_count
    end
    def increment_letters_view_count!
        self.set :letters_view_count, letters_view_count + 1
        self.set :view_count, view_count + 1
    end
    def reset_letter_comments_count!
        set :letter_comments_count,
        Letter.comments_for_user_id(id).count
    end
    def increment_letter_comments_count!
        self.set :letter_comments_count, letter_comments_count + 1
    end
    def decrement_letter_comments_count!
        self.set :letter_comments_count, letter_comments_count − 1
    end
    def reset_view_count!(_reset_letters_view_count = false)
        reset_letters_view_count! if _reset_letters_view_count
        self.set :view_count, view_logs.count + letters_view_count
    end
    #
    # END VIEW COUNT METHODS
    #
    def set_lat_and_lng!
        return if country.blank? && zipcode.blank?
        address = country + " postal code " + zipcode
        location = GeocoderMethods.search(address)
        if location
            self.lat = location["lat"]
            self.lng = location["lng"]
            self.save(:validate => false)
        end
    end
```

Disclosed below is a Ruby on Rails® implementation of a code snippet from a computer program code executed by the personal communication system 203 exemplarily illustrated in FIG. 2, for managing an address book for a sender and/or a recipient:

```

# Address Book

# Whether the user is in the owner's address book
def in_address_book?(owner)
    return false if owner.blank?
    owner.address_book_user_ids.include?(id)
end
def erase_from_address_book(user)
    if user.present?
        self.address_book.delete(user)
        self.add_to_black_list(user)
    end
end
def add_to_address_book(user)
    return if self == user
    if user.present? && !user.in_address_book?(self)
        self.address_book.push(user)
        self.remove_from_black_list(user)
        if user.send_add_to_address_book_notification
            send_add_to_address_book_email(user)
        end
        if user.push_on_added_to_address_book and
        user.ios_device_token
            APN.notify_async(user.ios_device_token,
            I18n.t('api.notifications.added_as_penpal', user: name))
        end
    end
end
def send_add_to_address_book_email(user)
    UserMailer.add_to_address_book_email({"actioner_id" =>
    self.id, "recipient_id" =>
        user.id}).deliver
end
# After delivery a letter,
# 1. auto add the recipient to the author's address book
# 2. auto add the author to the recipient's address book
def auto_add_to_addresss_book(user)
    return if self == user || user.blank?
    if !user.in_address_book?(self) && !user.in_black_list?(self)
        self.address_book.push(user)
    end
end

# Address Book

# Black List

def in_black_list? (owner)
    owner.black_list.include?(self)
end
def add_to_black_list(user)
    return if self == user
    self.black_list.push(user) unless user.in_black_list?(self)
end
def remove_from_black_list(user)
    self.black_list.delete(user) if user.in_black_list?(self)
end

# Black List

def do_things_after_joining_in_queue
    begin
        Resque.enqueue(DoThingsAfterJoining, self.id)
    rescue => e
        puts "User do things after joining in queue Error: #{e.to_s}"
    end
end
def do_things_after_joining
    add_social_friends
end
```

Disclosed below is a Ruby on Rails® implementation of a code snippet from a computer program code executed by the personal communication system 203 exemplarily illustrated in FIG. 2, for configuring a preliminary time condition for composition of a personalized communication:

```
def real_minimum_writing_duration
    minimum_writing_duration ||
    ProjectSetting.current.minimum_writing_duration
end
def minimum_writing_duration_minutes
    real_minimum_writing_duration / 60
end
def minimum_writing_duration_seconds
    real_minimum_writing_duration % 60
end
```

Disclosed below is a Ruby on Rails® implementation of a code snippet from a computer program code executed by the personal communication system 203 exemplarily illustrated in FIG. 2, for customizing personal clock settings on the GUI 205 of the personal communication system 203 exemplarily illustrated in FIG. 2:

```
def custom_writing_desk_clock
    writing_desk_clock || WritingDeskClock.default_clock
end
def custom_fridge_cover_url(version)
    fridge_cover.try(:url, version) ||
    ProjectSetting.current.fridge_cover.try(:url, version) ||
        '/assets/fridge_cover.jpg'
end
def custom_fridge_bg_color
    fridge_bg_color || ProjectSetting.current.fridge_bg_color || '#000'
end
def validate_minimum_cover_size
    return true if fridge_cover.blank?
    return true if !fridge_cover_changed?
        image = MiniMagick::Image.open(fridge_cover.path)
        if image [:width] < 205 || image[:height] < 315
            errors.add :fridge_cover, "should be larger than 205x315px!"
        end
```

-continued

```
    rescue => e
        errors.add :fridge_cover, e.message
    end
end
```

Disclosed below is a Ruby on Rails® implementation of a code snippet from a computer program code executed by the personal communication system 203 exemplarily illustrated in FIG. 2, for defining an action controller for configuring settings for a user account for a sender and/or a recipient:

```
//CONTROLLER
class SettingsController < ApplicationController
    force_ssl only: [:password]
    before_filter :require_login
    def index
        redirect_to profile_settings_path
    end
    def profile
        if request.put?
            if current_user.update_attributes(params[:user])
                message = "Successfully updated"
            else
                message = current_user.errors.full_messages.join(", ")
            end
            redirect_to profile_settings_path, notice: message
        end
    end
    def mailing_address
        @user_address = current_user.user_address || current_user.build_user_address(
            country: current_user.country, zipcode: current_user.zipcode )
        if request.put? and
            @user_address.update_attributes(params[:user][:user_address_attributes])
            redirect_to mailing_address_settings_path, notice: "Successfully updated"
        end
    end
    def password
        if request.put?
            if login_info_currect? and password_matches? and
                current_user.change_password!(params[:user][:password])
                redirect_to password_settings_path, notice: "Successfully updated"
            else
                current_user.errors.add(:old_password, "not correct") unless login_info_currect?
                current_user.errors.add(:password, "doesn't match confirmation") unless
                password_matches?
            end
        end
    end
end
```

Disclosed below is a Ruby on Rails® implementation of a code snippet from a computer program code executed by the personal communication system 203 exemplarily illustrated in FIG. 2, for generating the sender configured time condition and determining an optimal time condition from the generated sender configured time condition and the preliminary time condition configured by the personal communication system 203:

```
def social_networks
end
def timer
    @clocks = WritingDeskClock.enabled.order_by_position
    current_user.writing_desk_clock ||=
    WritingDeskClock.default_clock
    @ default_minimum_writing_duration =
        current_project_setting.minimum_writing_duration
    # In case the admin change it
    if current_user.minimum_writing_duration.present? &&
```

```
            current_user.minimum_writing_duration <
                @default_minimum_writing_duration
            current_user.minimum_writing_duration =
                @default_minimum_writing_duration
        end
        if request.put?
            format_minimum_writing_duration
            unless current_user.update_attributes (params [:user] )
                flash[:notice] =
                    current_user.errors.full_messages.join(', ')
            end
            redirect_to timer_settings_path
        end
    end
end
def disconnect
    current_user.disconnect_with params[:provider]
    redirect_to social_networks_settings_path, notice: "Successfully
    disconnected
        #{params[:provider].titleize}"
end
```

Disclosed below is a Ruby on Rails® implementation of a code snippet from a computer program code executed by the personal communication system 203 exemplarily illustrated in FIG. 2, for managing payment transactions associated with delivering a personalized communication:

```
def delete_payment_method
    if current_user.delete_payment_method!
        flash[:notice] = 'Payment method removed successfully.'
    else
        flash[:alert] = 'There was a problem removing your
        payment method. Please try
        again.'
    end
    redirect_to (request.env["HTTP_REFERER"] ||
    profile_settings_path)
end
```

Disclosed below is a Ruby on Rails® implementation of a code snippet from a computer program code executed by the personal communication system 203 exemplarily illustrated in FIG. 2, for formatting the preliminary time condition:

```
private
    def login_info_current?
        login(current_user.email, params[:user][:old_password]) == current_user
    end
    def password_matches?
        params[:user][:password] == params[:user][:password_confirmation]
    end
    def format_minimum_writing_duration
        if params[:user][:minimum_writing_duration_minutes].present? &&
            params[:user][:minimum_writing_duration_seconds].present?
            params[:user][:minimum_writing_duration] =
            params[:user][:minimum_writing_duration_minutes].to_i * 60 +
            params[:user][:minimum_writing_duration_seconds].to_i
            params[:user].delete(:minimum_writing_duration_minutes)
            params[:user].delete(:minimum_writing_duration_seconds)
        end
    end
end
```

Disclosed below is a Ruby on Rails® implementation of a code snippet from a computer program code executed by the personal communication system 203 exemplarily illustrated in FIG. 2, for setting headers on the GUI 205 of the personal communication system 203 exemplarily illustrated in FIG. 2:

```
//VIEWS- Setting header
- title t("settings.title.#{ params[:action] }")
- hide_title ||= false
%ul#settings_navigation
    - [:profile, :mailing_address, :social_networks, :password,
    :timer].each do |action|
        - is_active = params[:action] == action.to_s
        %li{ id: "setting_#{action}_link", class: [ :setting, (is_active ?
        :active : nil) ] }
            = link_to_unless is_active, t("settings.title.#{action}"),
            send("#{action}_settings_path")
    -# %li= link_to "Retrieve Letter", retrieve_letter_settings_path
- unless hide_title
    .form_title
        .title= t("settings.title.#{ params[:action] }").upcase
        .subtitle= t("settings.subtitle.#{ params[:action] }")
```

Disclosed below is a Ruby on Rails® implementation of a code snippet from a computer program code executed by the personal communication system 203 exemplarily illustrated in FIG. 2, for managing address information:

```
//VIEWS- Mailing Address
#setting_section_mailing_address.settings_content
    = render 'settings_header'
    = simple_form_for current_user, url:
    mailing_address_settings_path, html: {id:
        "user_address_form"} do |f|
        = f.error_notification
        .inputs
            = f.simple_fields_for :user_address, @user_address do
            |af|
                = af.input :name, required: false
                = af.input :address_line_one, required: false, label:
                :Address
                = af.input :address_line_two, required: false, label:
                '&nbsp;'
                = af.input :city, required: false
                = af.input :state, required: false
                = af.input :zipcode, required: false, label:
                'Postal Code'
```

-continued

```
                = af.input :country, required: false
                = af.hidden_field :lat
```

```
            = af.hidden_field :lng
            = f.button :submit, value: t('actions.save_changes'),
              id: "save_changes"
```

Disclosed below is a Ruby on Rails® implementation of a code snippet from a computer program code executed by the personal communication system 203 exemplarily illustrated in FIG. 2, for managing profile and password information:

```
//VIEWS - password
#setting_section_password.settings_content
    = render 'settings_header'
    = simple_form_for current_user, url:
      password_settings_path do |f|
            = f.error_notification
            .inputs
              = f.input :old_password
              = f.input :password, label:
                t('settings.password.new_password')
              = f.input :password_confirmation, label: "Confirm
                Password"
              = f.button :submit, value: t('actions.save_password'),
                id: :save_password
//VIEWS - profile
#setting_section_profile.settings_content
    = render 'settings_header'
    .po_box_wrapper
        #po_box_placard.po_box_bg{ title:
          t('pobox_widget.title') }
            = "P.O. BOX #{current_user.po_box_number}"
        #po_box_widget_tip.tip= t('pobox_widget.title')
#pobox_widget_instructions.hidden
    .popover
        .arrow
        .popover-inner
            %h3.popover-title
            .popover-title-tip
                = t('pobox_widget.title_tip')
            .popover-content
                %div
#pobox_widget_instructions_content.hidden
    %p= t('pobox_widget.step1')
    %table#pobox_btn_options
        %tr
            %td
                .mini_pobox_btn
                    = image_tag
                      "lettrs_pobox_widget_icon_20px.png"
                    %span= "P.O. Box
                      #{current_user.po_box_number}"
                    .tip= t("pobox_widget.mini_pobox_tip")
            %td.separator "- OR -"
            %td
                .standard_pobox_btn
                    = image_tag
                      "lettrs_pobox_widget_icon_26px.png"
                    %span= "P.O. Box
                      #{current_user.po_box_number}"
                    .tip= t("pobox_widget.standard_pobox_tip")
    %p= t('pobox_widget.step2')
    %p.input
        = text_field_tag "pobox_widget_script",
          pobox_widget_js, id:
          "pobox_widget_script", disabled: true, class: 'disabled'
        %a#copy_script.copy.disabled{data:
          {:"clipboard-target" =>
          "pobox_widget_script"}, title:
          t('pobox_widget.copy_to_clipboard'),
          disabled: true}
    %p= t('pobox_widget.step3')
    %p.input#mini_input
        = text_field_tag "mini_pobox_widget_div",
          "<div data-wrapper='pobox_widget'
          data-number='#{current_user.po_box_number}'
          data-size='mini'></div>", disabled:
          true, class: 'disabled'
        %a.copy.disabled#mini_input_copy{data:
          {:"clipboard-target" =>
          "mini_pobox_widget_div"}, title:
          t('pobox_widget.copy_to_clipboard')}
    %p.input#standard_input
        = text_field_tag "standard_pobox_widget_div",
          "<div data-wrapper='pobox_widget'
          data-number='#{current_user.po_box_number}'
          data-size='standard'></div>",
          disabled: true, class: 'disabled'
        %a.copy.disabled#standard_input_copy{data:
          {:"clipboard-target" =>
          "standard_pobox_widget_div" } , title:
          t('pobox_widget.copy_to_clipboard')}
    %p= t('pobox_widget.step4')
#profile_avatar= image_tag current_user.user_avatar(:full)
    = simple_form_for current_user, url: profile_settings_path do |f|
        - unless current_user.user_address. present?
            #po_box_mailing_address_tip.flashme= raw
              t('settings.profile.po_box_mailing_address_tip' , url:
              mailing_address_settings_path)
        = f.input :name, required: false
        = f.input :zipcode, required: false, label: 'Postal Code'
        = f.input :country, required: false
        = f.input :bio, label: 'Brief Bio', as: :text, input_html: {row: 3}
        #change_avatar_input
            = f.input :avatar, label: false
            %span.tape_150x50= t('actions.change_avatar')
            .filename{ data: { label:
              t('settings.profile.selected_file') } }
        .notification_settings
            = f.input :send_comments_notification, :as => :boolean,
              label:
              t(".send_comments_notification")
        .notification_settings{style: "margin-top:5px;"}
            = f.input :send_add_to_address_book_notification,
              :as => :boolean, label:
              t(".send_add_to_address_book_notification")
        = f.button :submit, t('actions.save_changes'), id: :save_changes
:javascript
    Flashy('#po_box_mailing_address_tip');
    $("input:file").change(function( ){
        var label = $(this).val( ).replace(/C:\\fakepath\\/i, ")
        var filename = $('#change_avatar_input .filename');
        filename.text( filename.data('label') + label );
    });
```

Disclosed below is a Ruby on Rails® implementation of a code snippet from a computer program code executed by the personal communication system 203 exemplarily illustrated in FIG. 2, for integrating social networking applications with the personal communication system 203 exemplarily illustrated in FIG. 2:

```
//VIEWS - social networks
#setting_section_social_networks.settings_content
    = render 'settings_header'
    %ul#social_operation.sns-link
        %li.facebook
            %i.icon-facebook-sign
            = link_to t('settings.social_networks.disconnect',
              provider: 'Facebook'),
              disconnect_provider_path(provider: :facebook), method:
              :put, class: ['sns-anchor',
              disconnect, :disconnect_facebook, (:hidden unless
              current_user.has_facebook?)]
            = link_to t('settings.social_networks.connect',
              provider: 'Facebook'),
              auth_at_provider_path(:provider => :facebook),
              class: ['sns-anchor', :connect,
              :connect_facebook, (:hidden if
              current_user.has_facebook?)], data: { url:
              auth_at_provider_path(:provider => :facebook),
              provider: :facebook }
        %li.twitter
```

```
    %i.icon-twitter
      = link_to t('settings.social_networks.disconnect',
        provider: 'Twitter'),
        disconnect_provider_path(provider: :twitter), method:
        :put, class: ['sns-anchor',
        :disconnect, :disconnect_twitter, (:hidden unless
        current_user.has_twitter?)]
      = link_to t('settings.social_networks.connect',
        provider: 'Twitter'),
        auth_at_provider_path(:provider => :twitter),
        class: ['sns-anchor', :connect,
        :connect_twitter, (:hidden if
        current_user.has_twitter?)], data: { url:
        auth_at_provider_path(:provider => :twitter),
        provider: :twitter }
  %li.google-plus
    %i.icon-google-plus-sign
```

```
        :disconnect, :disconnect_linkedin, (:hidden unless
        current_user.has_linkedin?)]
      = link_to t('settings.social_networks.connect',
        provider: 'LinkedIn'),
        auth_at_provider_path(:provider => :linkedin),
        class: ['sns-anchor', :connect,
        :connect_linkedin, (:hidden if
        current_user.has_linkedin?)], data: { url:
        auth_at_provider_path(:provider => :linkedin),
        provider: :linkedin }
```

Disclosed below is a Ruby on Rails® implementation of a code snippet from a computer program code executed by the personal communication system 203 exemplarily illustrated in FIG. 2, for invoking the running timer 405 exemplarily illustrated in FIG. 4I and FIG. 4L, on the GUI 205 of the personal communication system 203:

```
//VIEWS- timer
#setting_section_timer.settings_content
    = render partial: 'settings_header', locals: { hide_title: true }
    .form_title.clock_wrapper
        .title=t('settings.title.clock')
        .subtitle= t('settings. subtitle. clock')
    .clock_list
        .carousel_nav.prev#clock_prev
        .carousel_nav.next#clock_next
        #clock_carousel
            - @clocks.each do |c|
                - class_name = c.id == current_user.custom_writing_desk_clock.try(:id) ? 'selected'
            : ' '
                .clock_item{ class: class_name, data: {id: c.id}}
                    = image_tag c.try(:alt_image_url)
                    .text selected
    .form_title.duration_wrapper
        .title= t(' settings. title.duration')
        .subtitle= raw t('settings. subtitle. duration', time:
            format_time_to_hms(current_user.real_minimum_writing_duration))
    = simple_form_for current_user, url: timer_settings_path do |f|
        = f.hidden_field :writing_desk_clock_id
        = hidden_field_tag :default_minimum_writing_duration,
            @default_minimum_writing_duration
        .fields.first
            .icon-sort-up{data: {for: '#user_minimum_writing_duration_minutes'}}
            .icon-sort-down{data: {for: '#user_minimum_writing_duration_minutes'}}
            = f.input :minimum_writing_duration_minutes, readonly: true, label: 'minutes'
        .fields
            .icon-sort-up{data: {for: '#user_minimum_writing_duration_seconds'}}
            .icon-sort-down{data: {for: '#user_minimum_writing_duration_seconds'}}
            = f.input :minimum_writing_duration_seconds, readonly: true, label: 'seconds'
        = f.button :submit, t('actions.save_changes'), id: :save_changes
```

```
      = link_to t('settings.social_networks.disconnect',
        provider: 'Google'),
        disconnect_provider_path(provider: :google), method:
        :put, class: ['sns-anchor',
        :disconnect, :disconnect_google, (:hidden unless
        current_user.has_google?)]
      = link_to t('settings.social_networks.connect',
        provider: 'Google'),
        auth_at_provider_path(:provider => :google),
        class: ['sns-anchor', :connect,
        :connect_google, (:hidden if
        current_user.has_google?)], data: { url:
        auth_at_provider_path(:provider => :google),
        provider: :google }
  %li.linkedin
    %i.icon-linkedin-sign
      = link_to t('settings.social_networks.disconnect',
        provider: 'LinkedIn'),
        disconnect_provider_path(provider: :linkedin), method:
        :put, class: ['sns-anchor',
```

The terms "drawer", "fridge", "shoebox", "counter", etc., in the code snippets disclosed above refer to different interface sections provided on the GUI 205 of the personal communication system 203 exemplarily illustrated in FIG. 2. For example, the term "drawer" refers to the archiving interface section 408 exemplarily illustrated in FIG. 5; the term "fridge" refers to an electronic dashboard (not shown) provided on the GUI 205; the term "shoebox" refers to a storage interface section (not shown) provided on the GUI 205; and the term "counter" refers to a collection interface section (not shown) provided on the GUI 205. Furthermore, the term "magnet" refers to customizable adornment objects configured as dynamic placeholders on the GUI 205 for digital links, displays, application programming interface (API) calls, action buttons, advertising, electronic commerce, etc.

It will be readily apparent that the various methods, algorithms, and computer programs disclosed herein may be implemented on computer readable media appropriately programmed for computing devices. As used herein, "computer readable media" refers to non-transitory computer readable media that participate in providing data, for example, instructions that may be read by a computer, a processor or a similar device. Non-transitory computer readable media comprise all computer readable media, for example, non-volatile media, volatile media, and transmission media, except for a transitory, propagating signal. Non-volatile media comprise, for example, optical discs or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to a processor, etc. Common forms of computer readable media comprise, for example, a floppy disk, a flexible disk, a hard disk, magnetic tape, a laser disc, a Blu-ray Disc® of Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

The computer programs that implement the methods and algorithms disclosed herein may be stored and transmitted using a variety of media, for example, the computer readable media in a number of manners. In an embodiment, hardwired circuitry or custom hardware may be used in place of, or in combination with, software instructions for implementation of the processes of various embodiments. Therefore, the embodiments are not limited to any specific combination of hardware and software. In general, the computer program codes comprising computer executable instructions may be implemented in any programming language. Some examples of programming languages that can be used comprise C, C++, C#, Java®, JavaScript®, Fortran, a stack oriented programming language, Ruby, Perl®, Python®, Visual Basic®, hypertext preprocessor (PHP), Microsoft® .NET etc. Other object-oriented, functional, scripting, and/or logical programming languages may also be used. The computer program codes or software programs may be stored on or in one or more mediums as object code. Various aspects of the method and system disclosed herein may be implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. Various aspects of the method and system disclosed herein may be implemented as programmed elements, or non-programmed elements, or any suitable combination thereof. The computer program product disclosed herein comprises one or more computer program codes for implementing the processes of various embodiments.

Where databases are described such as the content databases 212, it will be understood by one of ordinary skill in the art that (i) alternative database structures to those described may be readily employed, and (ii) other memory structures besides databases may be readily employed. Any illustrations or descriptions of any sample databases disclosed herein are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries can be different from those disclosed herein. Further, despite any depiction of the databases as tables, other formats including relational databases, object-based models, and/or distributed databases may be used to store and manipulate the data types disclosed herein. Likewise, object methods or behaviors of a database can be used to implement various processes such as those disclosed herein. In addition, the databases may, in a known manner, be stored locally or remotely from a device that accesses data in such a database. In embodiments where there are multiple databases in the system, the databases may be integrated to communicate with each other for enabling simultaneous updates of data linked across the databases, when there are any updates to the data in one of the databases.

The present invention can be configured to work in a network environment comprising one or more computers that are in communication with one or more devices via a network. The computers may communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, some examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system, some examples of which are disclosed above. While the operating system may differ depending on the type of computer, the operating system will continue to provide the appropriate communications protocols to establish communication links with the network. Any number and type of machines may be in communication with the computers.

The present invention is not limited to a particular computer system platform, processor, operating system, or network. One or more aspects of the present invention may be distributed among one or more computer systems, for example, servers configured to provide one or more services to one or more client computers, or to perform a complete task in a distributed system. For example, one or more aspects of the present invention may be performed on a client-server system that comprises components distributed among one or more server systems that perform multiple functions according to various embodiments. These components comprise, for example, executable, intermediate, or interpreted code, which communicate over a network using a communication protocol. The present invention is not limited to be executable on any particular system or group of systems, and is not limited to any particular distributed architecture, network, or communication protocol.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A computer implemented method for generating and delivering a personalized communication based on a time condition, said method employing a personal communication system comprising at least one processor configured to execute computer program instructions for performing said method, said method comprising:

configuring a preliminary time condition by said personal communication system, said configured preliminary time condition defining a minimum time required for composing said personalized communication;

determining an optimal time condition selected from the group consisting of said configured preliminary time condition, a sender configured time condition, and a recipient configured time condition, by said personal communication system, wherein said optimal time condition is a greater one of said configured preliminary time condition, said sender configured time condition, and said recipient configured time condition;

displaying said configured preliminary time condition and said determined optimal time condition on a sender device via a graphical user interface provided by said personal communication system;

receiving media content from said sender device by said personal communication system via said graphical user interface;

detecting, by said personal communication system, an attempt by a sender to generate and send said personalized communication based on said received media content;

timing said composition of said personalized communication on said detection of said attempt to generate and send said personalized communication based on said received media content and generating a timing verification report based on said timing by said personal communication system for verifying whether said determined optimal time condition is met; and performing an action based on said verification indicated in said generated timing verification report by said personal communication system, wherein said action comprises:

rendering a notification to said sender device for instructing said sender to continue said composition of said personalized communication until said determined optimal time condition is met; and generating said personalized communication based on said received media content and delivering said generated personalized communication to one or more recipient devices, when said determined optimal time condition is met.

2. The computer implemented method of claim 1, further comprising receiving sender defined time parameters from said sender device and adding said received sender defined time parameters to said configured preliminary time condition to generate said sender configured time condition by said personal communication system.

3. The computer implemented method of claim 1, further comprising receiving recipient defined time parameters from each of said one or more recipient devices and adding said received recipient defined time parameters to said configured preliminary time condition to generate said recipient configured time condition by said personal communication system.

4. The computer implemented method of claim 1, further comprising maintaining a time stamp for each said generated personalized communication by said personal communication system for indicating time devoted by said sender for said each said generated personalized communication.

5. The computer implemented method of claim 1, further comprising calculating and displaying a total time devoted by said sender for composing one or more personalized communications on said graphical user interface by said personal communication system.

6. The computer implemented method of claim 1, further comprising displaying a running timer on said sender device by said personal communication system via said graphical user interface during said composition of said personalized communication, wherein said running timer is configured to one of count up from zero to said determined optimal time condition and count down from said determined optimal time condition to zero.

7. The computer implemented method of claim 1, further comprising filtering personalized communications that do not meet said determined optimal time condition by said personal communication system and excluding said filtered personalized communications from said delivery to said one or more recipient devices.

8. The computer implemented method of claim 1, wherein said media content comprises one or more of gesture content, textual content, image content, audio content, video content, audiovisual content, multimedia content, animations, digital content, electronic mail content, messaging content, voicemail content, document content, and social media content.

9. A personal communication system for generating and delivering a personalized communication based on a time condition, said personal communication system comprising:

a non-transitory computer readable storage medium configured to store computer program instructions defined by modules of said personal communication system;

at least one processor communicatively coupled to said non-transitory computer readable storage medium, said at least one processor configured to execute said defined computer program instructions;

a time configuration module configured to configure a preliminary time condition, said configured preliminary time condition defining a minimum time required for composing said personalized communication;

said time configuration module further configured to determine an optimal time condition selected from the group consisting of said configured preliminary time condition, a sender configured time condition, and a recipient configured time condition, wherein said optimal time condition is a greater one of said configured preliminary time condition, said sender configured time condition, and said recipient configured time condition;

a graphical user interface configured to display said configured preliminary time condition and said determined optimal time condition on a sender device;

a data communication module configured to receive media content from said sender device via said graphical user interface;

a detection module configured to detect an attempt by a sender to generate and send said personalized communication based on said received media content;

a time analytics engine configured to time said composition of said personalized communication on said detection of said attempt to generate and send said personalized communication based on said received media content, and to generate a timing verification report based on said timing for verifying whether said determined optimal time condition is met;

an action management module configured to perform an action based on said verification indicated in said generated timing verification report, wherein said action management module is configured to transmit instructions to one of said data communication module and a personalized communication management module to perform said action, wherein said action comprises:

said data communication module further configured to render a notification to said sender device for instructing said sender to continue said composition of said personalized communication until said determined optimal time condition is met; and said personalized communication management module configured to generate said personalized communication based on said received media content and deliver said generated personalized communication to one or more recipient devices, when said determined optimal time condition is met.

10. The personal communication system of claim 9, wherein said data communication module is further configured to receive sender defined time parameters from said sender device, and wherein said time configuration module is further configured to add said received sender defined time parameters to said configured preliminary time condition to generate said sender configured time condition.

11. The personal communication system of claim 9, wherein said data communication module is further configured to receive recipient defined time parameters from each of said one or more recipient devices, and wherein said time configuration module is further configured to add said received recipient defined time parameters to said configured preliminary time condition to generate said recipient configured time condition.

12. The personal communication system of claim 9, wherein said time analytics engine is further configured to maintain a time stamp for each said generated personalized communication for indicating time devoted by said sender for said each said generated personalized communication.

13. The personal communication system of claim 9, wherein said time analytics engine is further configured to calculate a total time devoted by said sender for composing one or more personalized communications, and wherein said graphical user interface in communication with said time analytics engine, is further configured to display said calculated total time.

14. The personal communication system of claim 9, wherein said graphical user interface is configured to display a running timer on said sender device during said composition of said personalized communication, wherein said running timer is configured to one of count up from zero to said determined optimal time condition and count down from said determined optimal time condition to zero.

15. The personal communication system of claim 9, wherein said personalized communication management module is further configured to filter personalized communications that do not meet said determined optimal time condition and exclude said filtered personalized communications from said delivery to said one or more recipient devices.

16. A computer program product comprising a non-transitory computer readable storage medium, said non-transitory computer readable storage medium storing computer program codes that comprise instructions executable by at least one processor, said computer program codes comprising:

a first computer program code for configuring a preliminary time condition, said configured preliminary time condition defining a minimum time required for composing a personalized communication;

a second computer program code for determining an optimal time condition selected from the group consisting of said configured preliminary time condition, a sender configured time condition, and a recipient configured time condition, wherein said optimal time condition is a greater one of said configured preliminary time condition, said sender configured time condition, and said recipient configured time condition, and wherein said second computer program code further comprises for displaying said configured preliminary time condition and said determined optimal time condition on a sender device via a graphical user interface provided by said personal communication system;

a third computer program code for receiving media content from said sender device via said graphical user interface;

a fourth computer program code for detecting an attempt by a sender to generate and send said personalized communication based on said received media content;

a fifth computer program code for timing said composition of said personalized communication on said detection of said attempt to generate and send said personalized communication based on said received media content;

a sixth computer program code for generating a timing verification report based on said timing for verifying whether said determined optimal time condition is met; and a seventh computer program code for performing an action based on said verification indicated in said generated timing verification report, wherein said seventh computer program code comprises:

an eighth computer program code for rendering a notification to said sender device for instructing said sender to continue said composition of said personalized communication until said determined optimal time condition is met; and a ninth computer program code for generating said personalized communication based on said received media content and delivering said generated personalized communication to one or more recipient devices, when said determined optimal time condition is met.

* * * * *